United States Patent
Paglieroni et al.

(10) Patent No.: US 11,670,036 B2
(45) Date of Patent: Jun. 6, 2023

(54) SYSTEM AND METHOD FOR IDENTIFYING OBJECTS OF INTEREST IN IMAGES BASED ON LIKELIHOOD MAP DECLUTTERING

(71) Applicant: Lawrence Livermore National Security, LLC, Livermore, CA (US)

(72) Inventors: David W. Paglieroni, Pleasanton, CA (US); Harry E. Martz, Jr., Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 36 days.

(21) Appl. No.: 16/928,653

(22) Filed: Jul. 14, 2020

(65) Prior Publication Data

US 2022/0020203 A1 Jan. 20, 2022

(51) Int. Cl.
*G06T 15/08* (2011.01)
*G06K 9/62* (2022.01)
(Continued)

(52) U.S. Cl.
CPC .......... *G06T 15/08* (2013.01); *G06K 9/6256* (2013.01); *G06K 9/6267* (2013.01);
(Continued)

(58) Field of Classification Search
CPC .... G05T 15/08; G06K 9/6256; G06K 9/6267; G06T 7/0002; G06T 15/005; G06T 2207/10081
See application file for complete search history.

(56) References Cited

U.S. PATENT DOCUMENTS 6,813,374 B1 11/2004 Karimi et al.
9,495,764 B1 * 11/2016 Boardman ............... G06T 7/62
(Continued)

FOREIGN PATENT DOCUMENTS

CN 1321884 A * 11/2001
KR 10 20180009904 A 1/2018

OTHER PUBLICATIONS

Machine translation of CN-1321884 A, Published on Nov. 14, 2001. (Year: 2001).*
(Continued)

*Primary Examiner* — Sing-Wai Wu
(74) *Attorney, Agent, or Firm* — Harness, Dickey & Pierce, P.L.C.

(57) ABSTRACT

An automatic threat recognition system and method is disclosed for scanning the x-ray CT image of an article to identify the objects of interest (OOIs) contained within the article, which are otherwise not always quickly apparent or discernable to an individual. The system uses a computer to receive information from two-dimensional (2D) image slices from a reconstructed computed tomography (CT) scan image and to produce a plurality of voxels for each slice of the 2D image. The computer analyzes the voxels to create a likelihood map (LM) representing likelihoods that voxels making up the CT image are associated with a material of interest (MOI). The computer further analyzes the LM to construct neighborhoods of voxels within the LM, and classifies each voxel neighborhood based on its features, thereby decluttering the LM to facilitate the process of connecting voxels of a like MOI together to form segments. The computer classifies each candidate segment based on its features, thereby identifying those segments that correspond to objects of interest.

18 Claims, 26 Drawing Sheets

(51) Int. Cl.
- G06T 7/00 (2017.01)
- G06T 15/00 (2011.01)
- G06V 10/25 (2022.01)
- G01V 5/00 (2006.01)

(52) U.S. Cl.
CPC .......... *G06T 7/0002* (2013.01); *G06T 15/005* (2013.01); *G06T 2207/10081* (2013.01)

(56) References Cited

U.S. PATENT DOCUMENTS

| | | | |
|---|---|---|---|
| 2007/0014471 A1 | 1/2007 | Simanovsky et al. | |
| 2007/0235658 A1 | 10/2007 | Zimdars et al. | |
| 2009/0169104 A1* | 7/2009 | Ioannou | G06V 10/507 382/170 |
| 2010/0046704 A1 | 2/2010 | Song et al. | |
| 2010/0296709 A1 | 11/2010 | Ostrovsky-Berman et al. | |
| 2014/0010342 A1 | 1/2014 | Basu et al. | |
| 2015/0332448 A1 | 11/2015 | Zhang et al. | |
| 2017/0270366 A1* | 9/2017 | Kuznetsov | G08B 21/02 |
| 2017/0365074 A1 | 12/2017 | Basu | |
| 2020/0051017 A1 | 2/2020 | Dujmic | |

OTHER PUBLICATIONS

L. Shapiro and G. Stockman, "Computer Vision", New Jersey, Prentice-Hall, 2001, pp. 279-325.
U.S. Appl. No. 16/540,610, filed Aug. 14, 2019, David W. Paglieroni.
Gao et al. Accurate Segmentation of CT Male Pelvic Organs via Regression-Based Deformable Models and Multi-Task Random Forests. IEEE Transactions on Medical imaging. Jun. 2016, vol. 35, No. 6, pp. 1532-1543.
International Search Report and Written Opinion regarding Application No. PCT/US2021/032537, dated Sep. 7, 2021.
R. Achanta, "SLIC Superpixels Compared to State-of-the-Art Superpixel Methods", IEEE Trans. PAMI, 34, 11, Nov. 2012, pp. 2274-228.
D. Paglieroni, "Neighborhood Classification Maps for Automatic Threat Recognition in CT Images of Airport Baggage", LLNL record of invention, submitted Oct. 14, 2019.
T. Pappas, "An Adaptive Clustering Algorithm for Image Segmentation", IEEE Trans. Sig. Proc., 3, Mar. 1994, pp. 162-177.
R. Achanta, "SLIC Superpixels Compared to State-of-the-Art Superpixel Methods", IEEE Trans. PAMI, 34, Nov. 11, 2012, pp. 2274-228.
D. Paglieroni, H. Chandrasekaran, C. Pechard and H. Martz Jr., "Consensus Relaxation on Materials of Interest for Adaptive ATR in CT Images of Baggage", Proc. SI18D SPIE Defense and Security Symposium, Anomaly Detection and Imaging with X-Rays (ADIX) III, Orlando, FL, USA, Apr. 17-18, 2018.
O. Ronneberger, P. Fischer and T. Brox, "U-Net: Convolutional Networks for Biomedical Image Segmentation". arXiv:1505.04597, 2015.
Y. F. A. Gaus, N. Bhowmik, S. Akcay and T. Breckon, "Evaluating the Transferability and Adversarial Discrimination of Convolutional Neural Networks for Threat Object Detection and Classification within X-Ray Security Imagery," 2019 18th IEEE International Conference on Machine Learning and Applications (ICMLA), Boca Raton, FL, USA, 2019, pp. 420-425.
G. Landry, J. Seco, M. Gaudreault and F. Verhaegen, "Deriving effective atomic numbers from DECT based on a parameterization of the ratio of high and low linear attenuation coefficients," Phys. Med. Biol., 58, 2013, pp. 6851-6866.
K. Bond, J. Smith, J. Treuer, S. Azevedo, J. Kallman and H. Martz Jr., ZeCalc Algorithm Details, Version 6, LLNL Tech. Rep., LLNL-TR-609327, Jan. 2013.
S. Azevedo, H. Martz Jr., M. Aufderheide, W. Brown, K. Champley, J. Kallman, P. Roberson, D. Schneberk, I. Seetho and J. Smith, "System-Independent Characterization of Materials using Dual-Energy Computed Tomography," IEEE Trans. Nuc. Sci., 63(1), 341-350, 2016.
K. Champley, S. Azevedo, I. Seetho, S. Glenn, L. McMichael, J. Smith, J. Kallman, W. Brown and H. Martz, "Method to Extract System-Independent Material Properties from Dual-Energy X-ray CT," IEEE Trans. Nuc. Sci., 66(3), 2019.
Crawford, C., Task Order 4 Final Report: https://myfiles.neu.edu/groups/ALERT/stretegic_studies/T04FinalReport.pdf (2014).
P. Ram and A. Gray, "Density Estimation Trees", Proc. KDD, Aug. 21-24, 2011, San Diego, Ca, USA, Copyright 2011 ACM 978-1-4503-0813-7/11/08.
A. Criminisi, J. Shotton and E. Konokoglu, "Decision Forests for Classification, Regression, Density Estimation, Manifold Learning and Semi-Supervised Learning", Microsoft Research Technical Report GTR-2011-114, 2011, pp. 68-91.
L. Breiman, "Random Forests", Machine Learning, 45, 2001, pp. 5-32.

\* cited by examiner

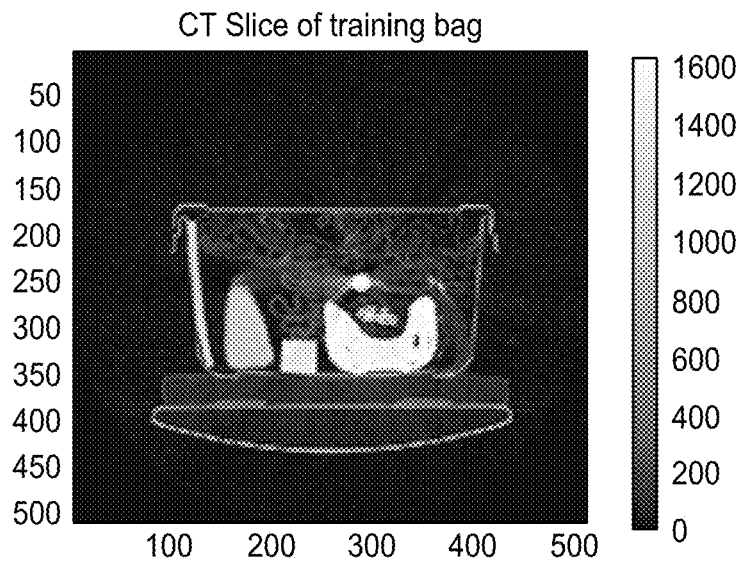
FIGURE 3a
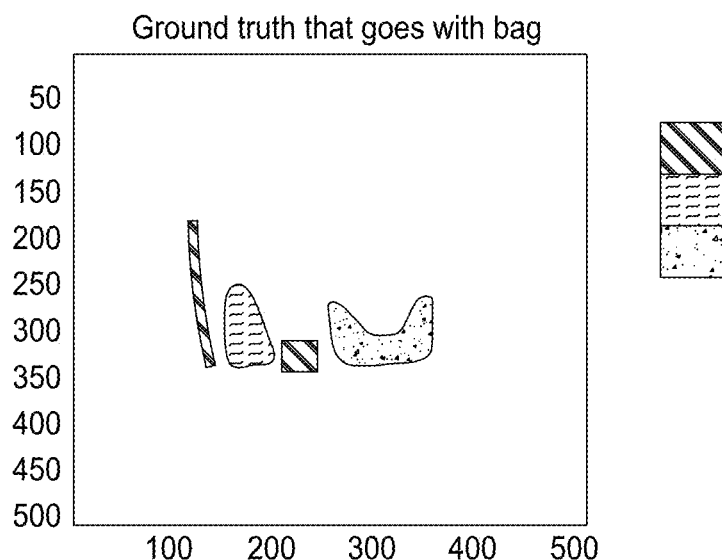
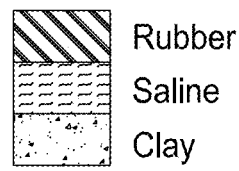
FIGURE 3b
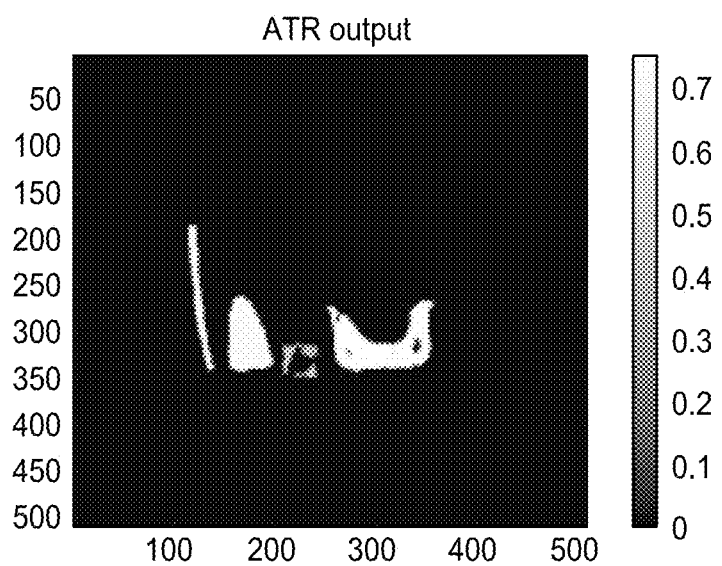
FIGURE 3c

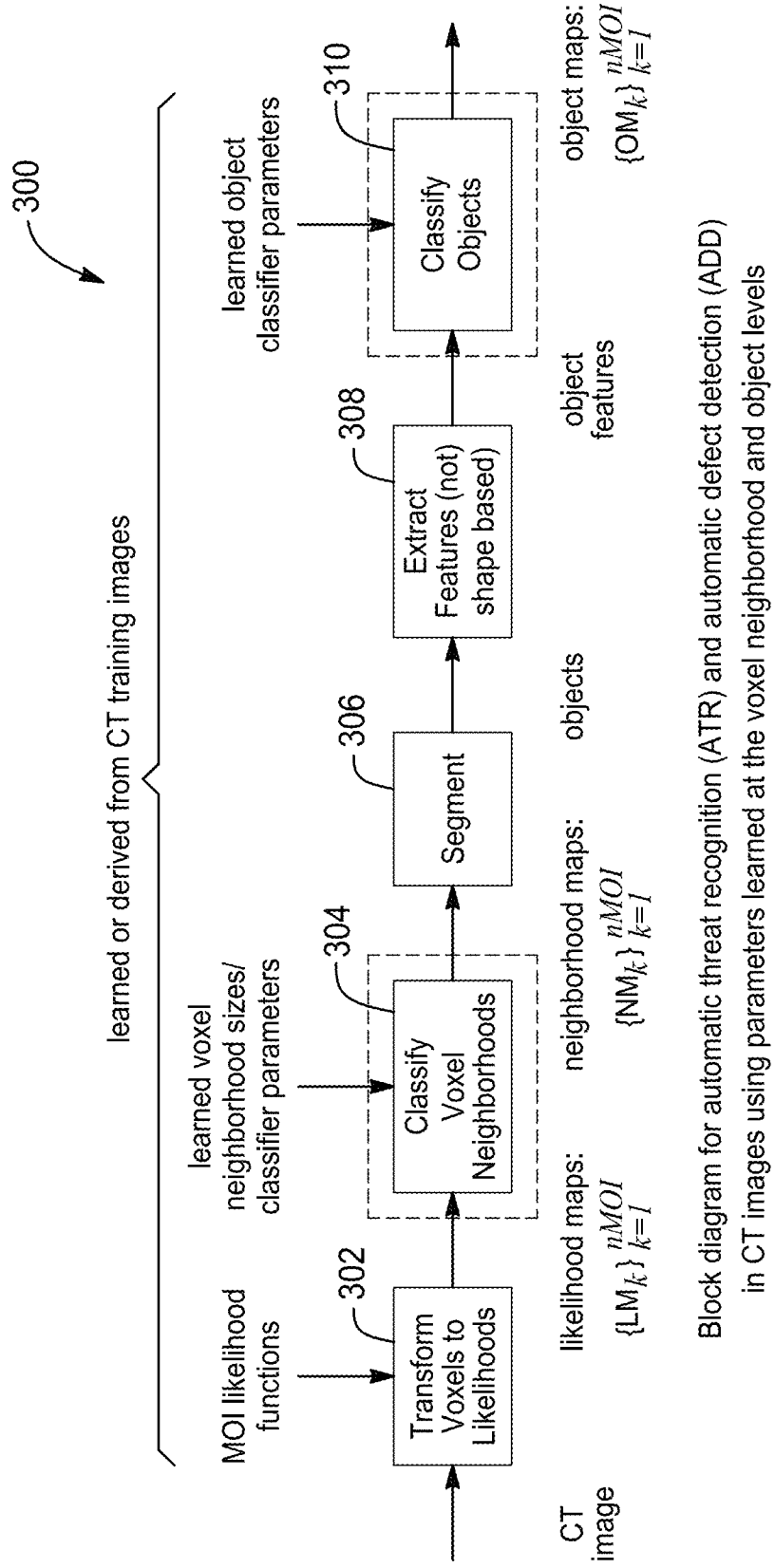

Likelihood functions for clay, rubber and saline derived from a training set of 30 bags

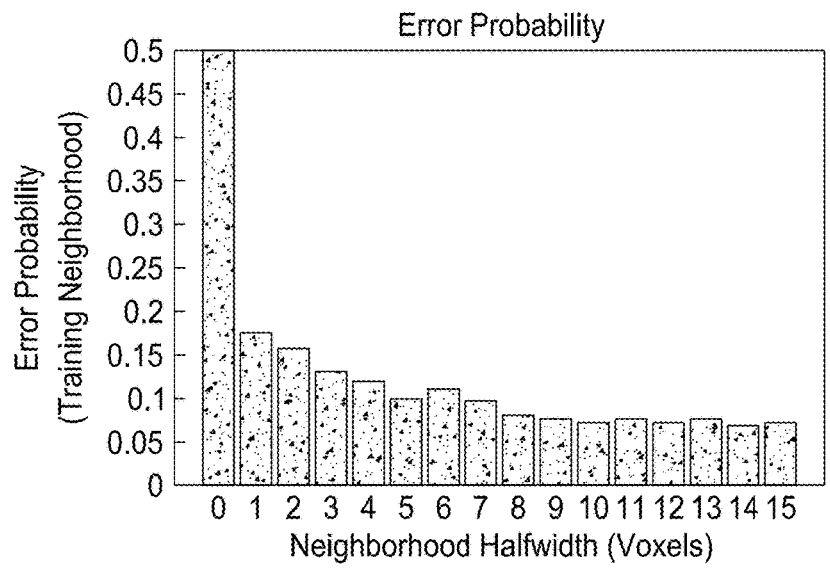
FIGURE 11a1
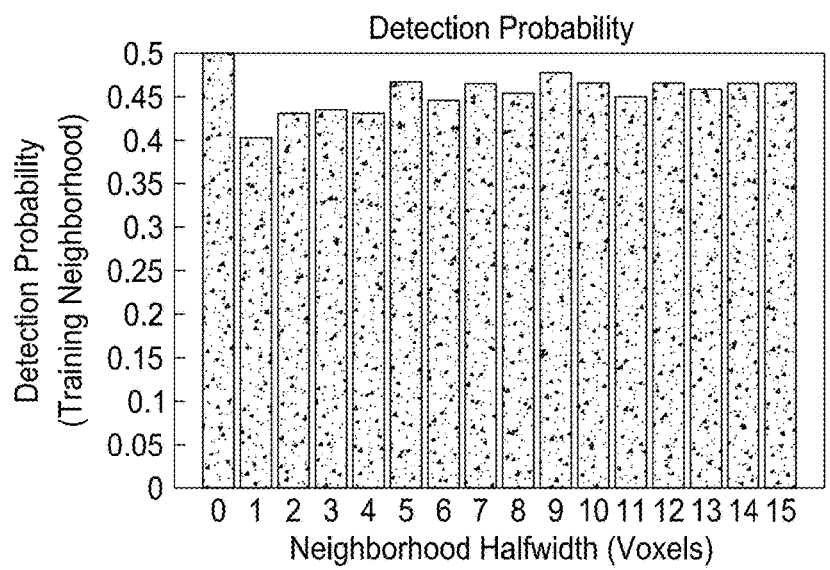
FIGURE 11a2
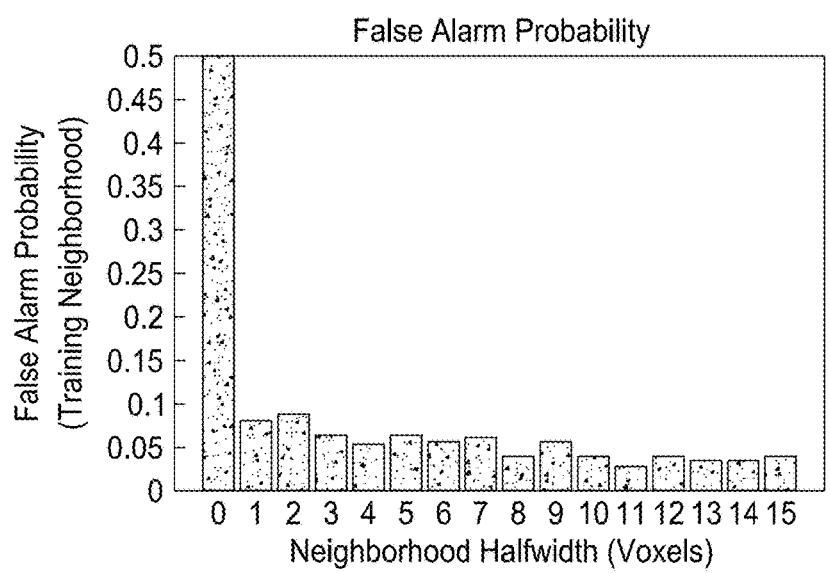
FIGURE 11a3
(a) Clay

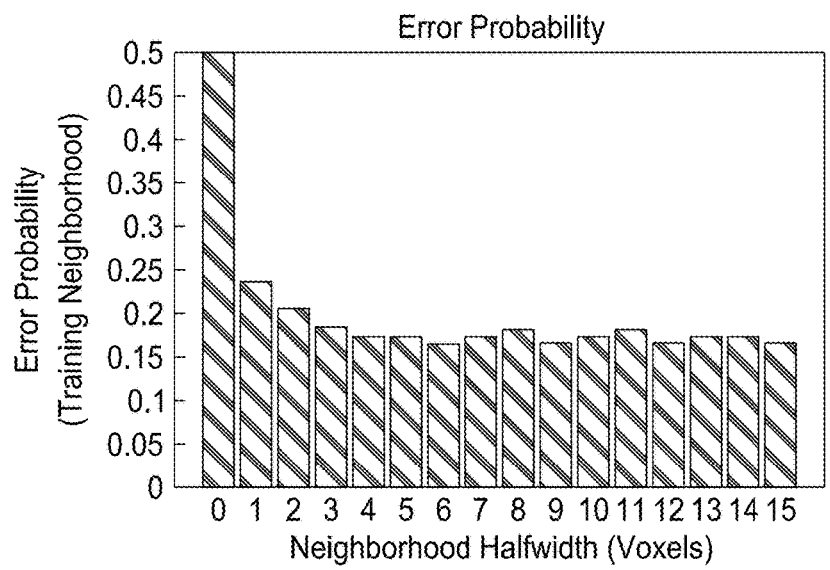
FIGURE 11b1
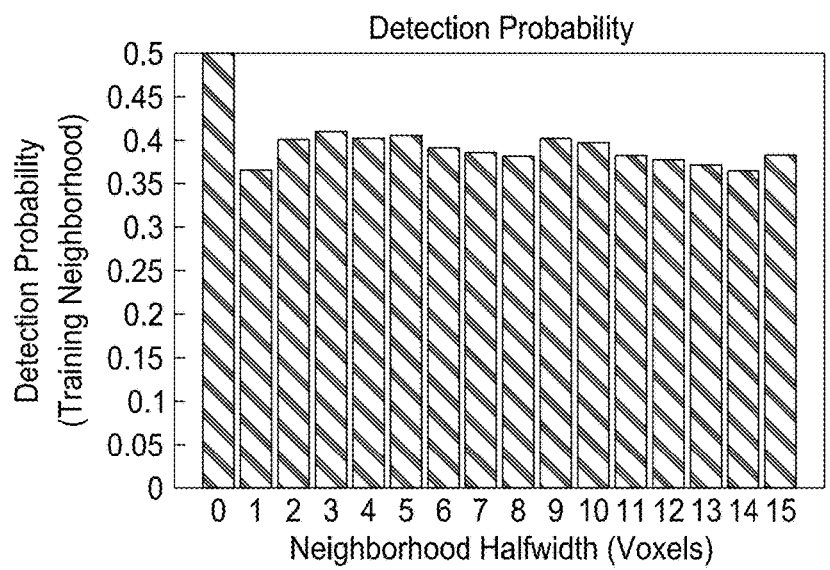
FIGURE 11b2
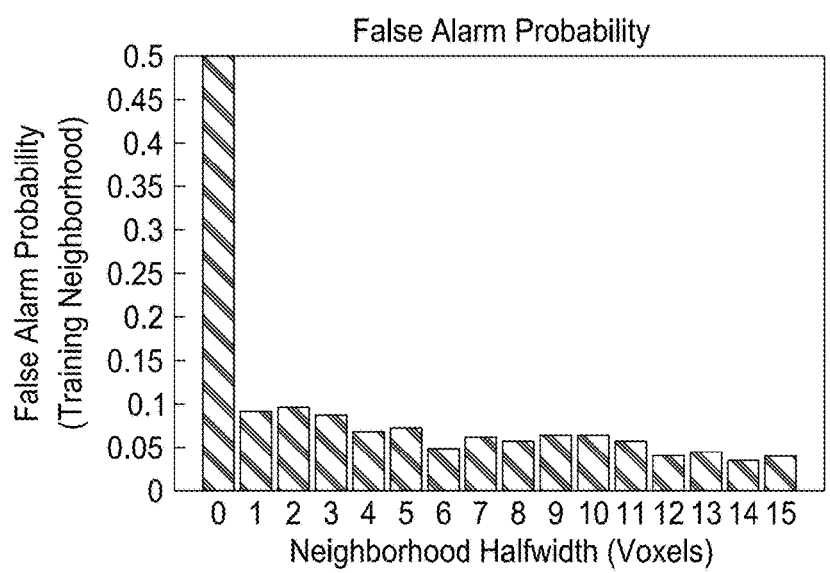
FIGURE 11b3

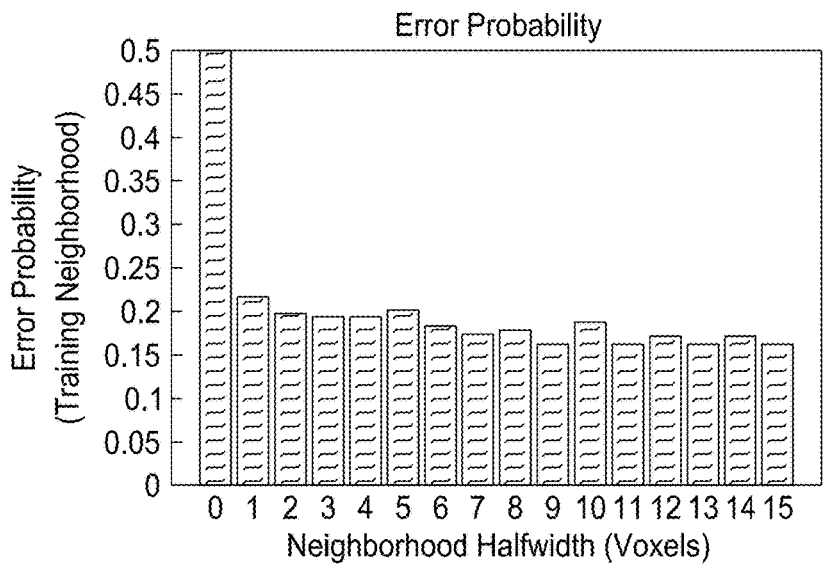
FIGURE 11c1
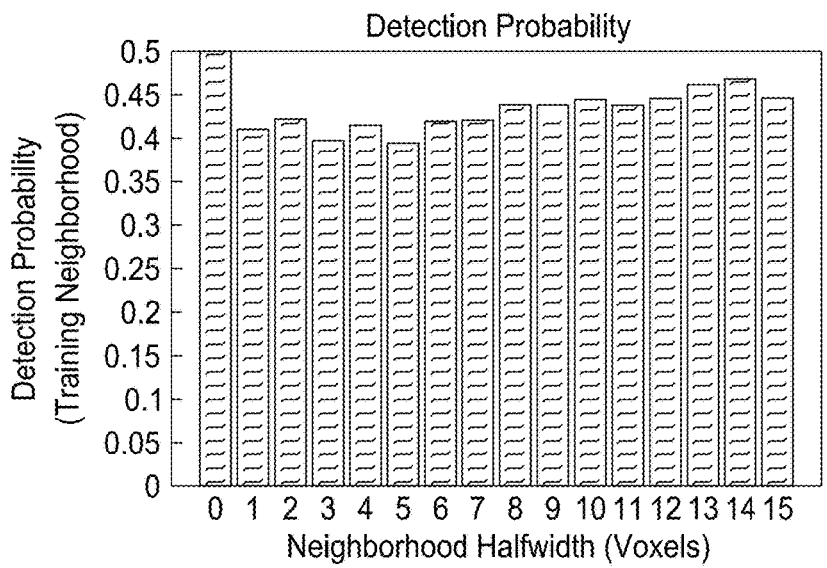
FIGURE 11c2
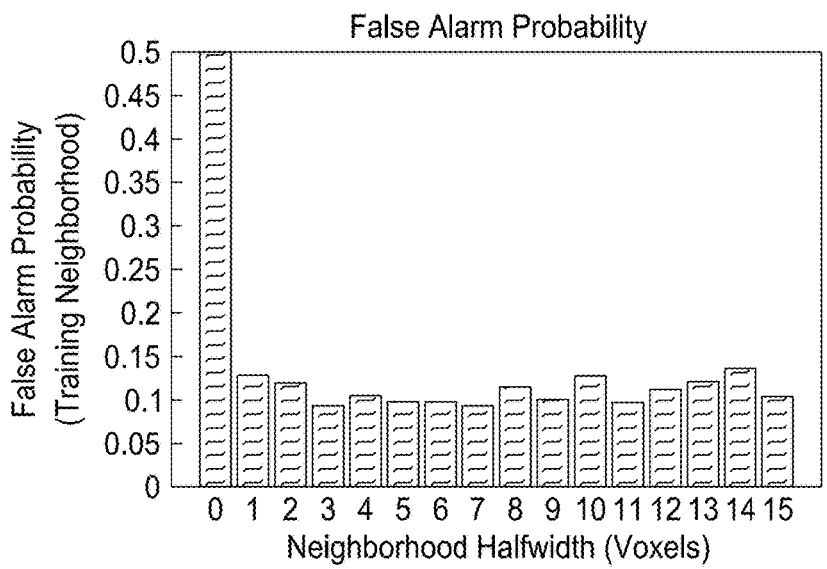
FIGURE 11c3
(c) Saline

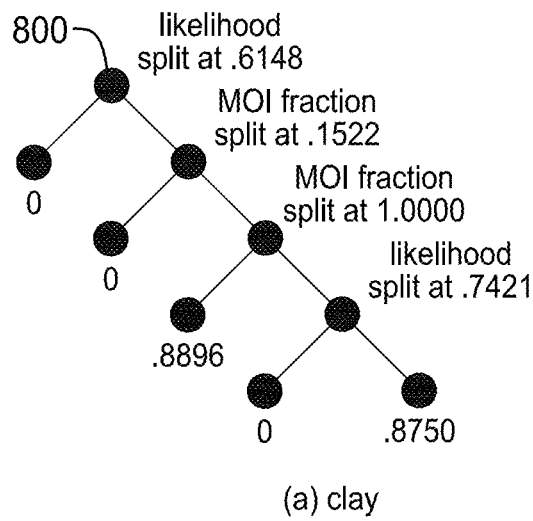
(a) clay
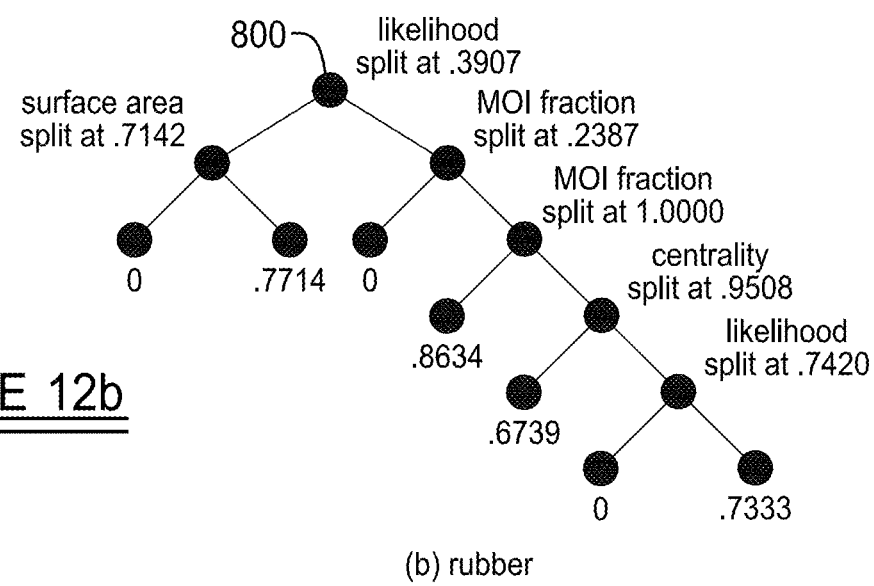
FIGURE 12b
(b) rubber
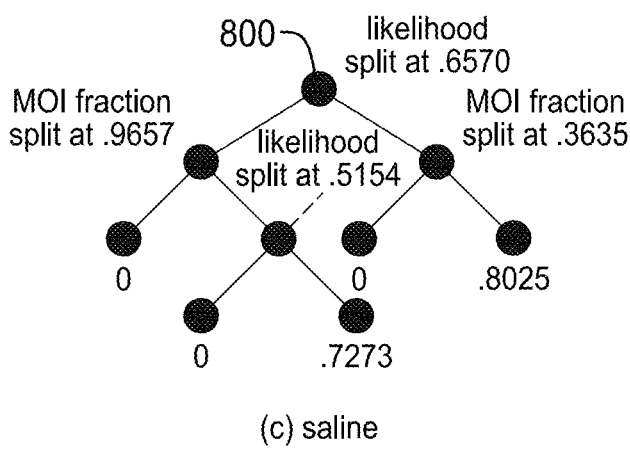
(c) saline
Trained binary classification trees for features of voxel neighborhood in (a) clay, (b) rubber and (c) saline LMs

| Material of Interest | Neighborhood Halfwidth (voxels) for Fewest Training Errors | Error Probability on Training Data | Detection Probability on Training Data | False Alarm Probability on Training Data |
|---|---|---|---|---|
| Clay | 14 | 0.0700 | 0.9289 | 0.0781 |
| Rubber | 6 | 0.1656 | 0.7705 | 0.1017 |
| Saline | 15 | 0.1612 | 0.8843 | 0.2016 |

FIGURE 13

Segment Features

| Feature | Remarks |
|---|---|
| MOI ID | ID of material (from 1 to K) that best explains segment material composition |
| MOI score | a normalized likelihood from 0 to 1 |
| location | centroid in x, y and z |
| extent | in x, y, z and overall |
| mass | in kg |
| thickness | in cm |
| texture | based on standard deviation of least noisy channel values for CT image voxels in the segment |

FIGURE 14

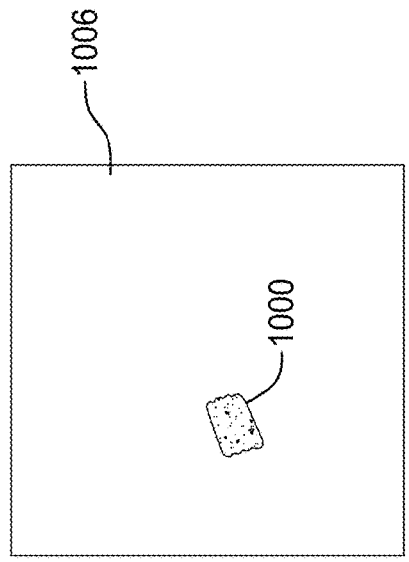
Clay: I025 Slice 70
CT Image
FIGURE 15a
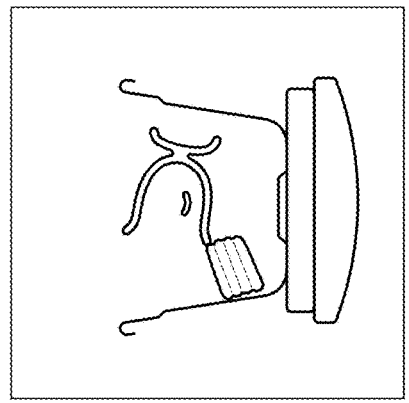
Ground Truth Map
FIGURE 15b
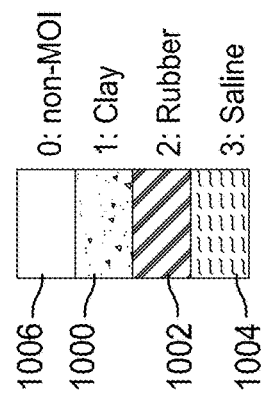
0: non-MOI — 1006
1: Clay — 1000
2: Rubber — 1002
3: Saline — 1004
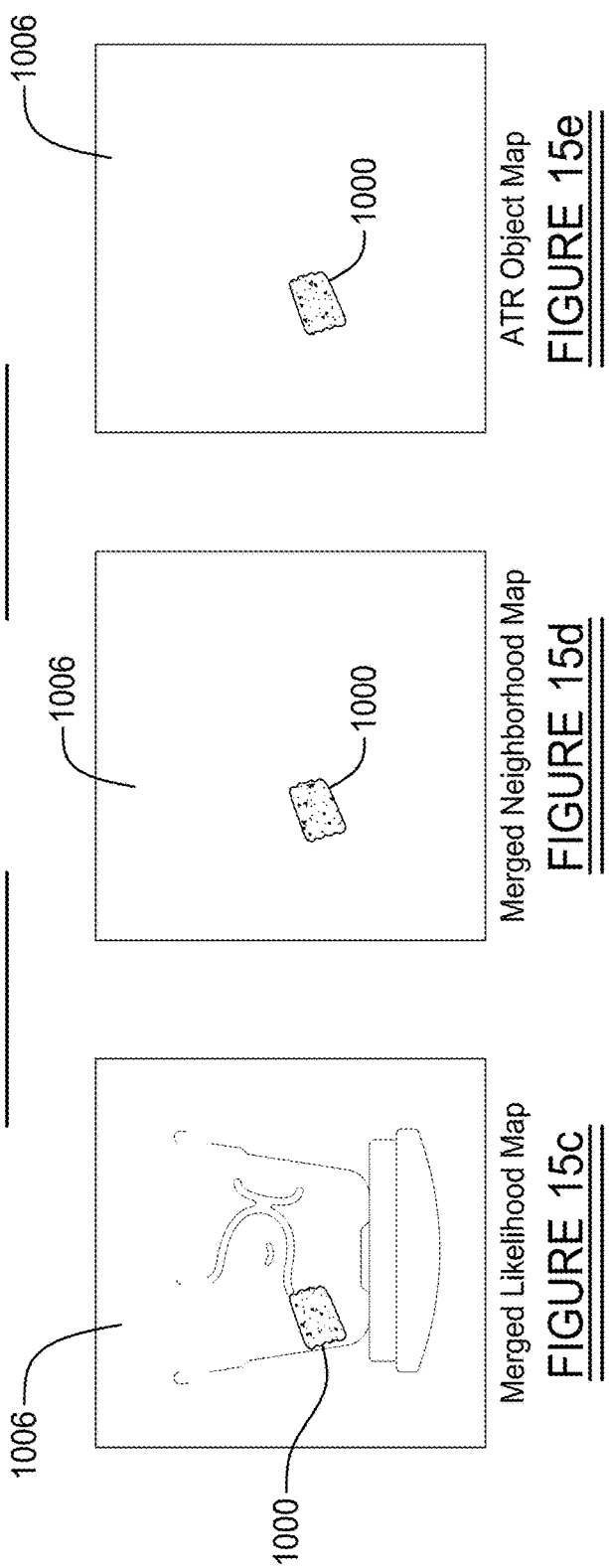
Merged Likelihood Map
FIGURE 15c
Merged Neighborhood Map
FIGURE 15d
ATR Object Map
FIGURE 15e

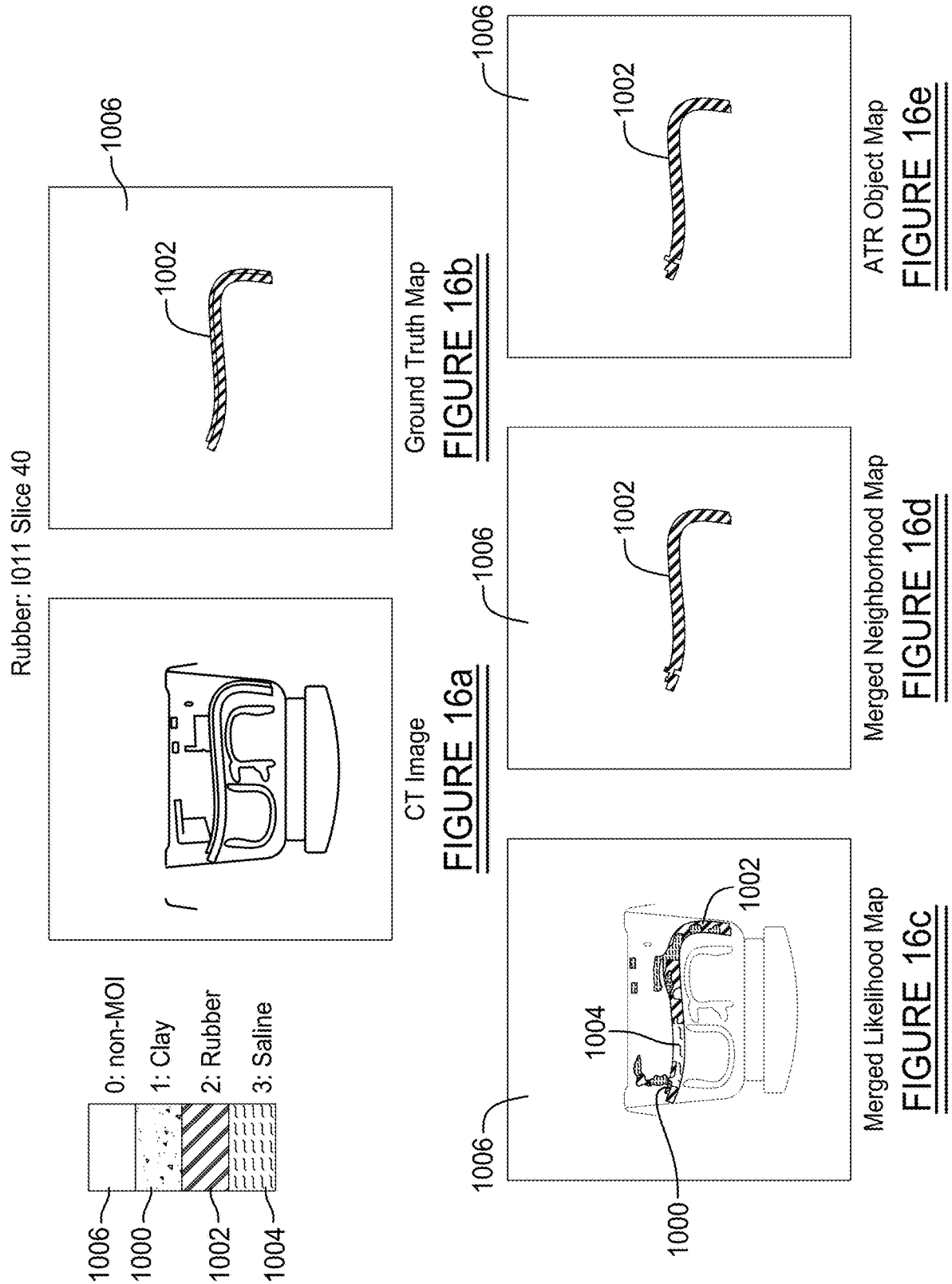

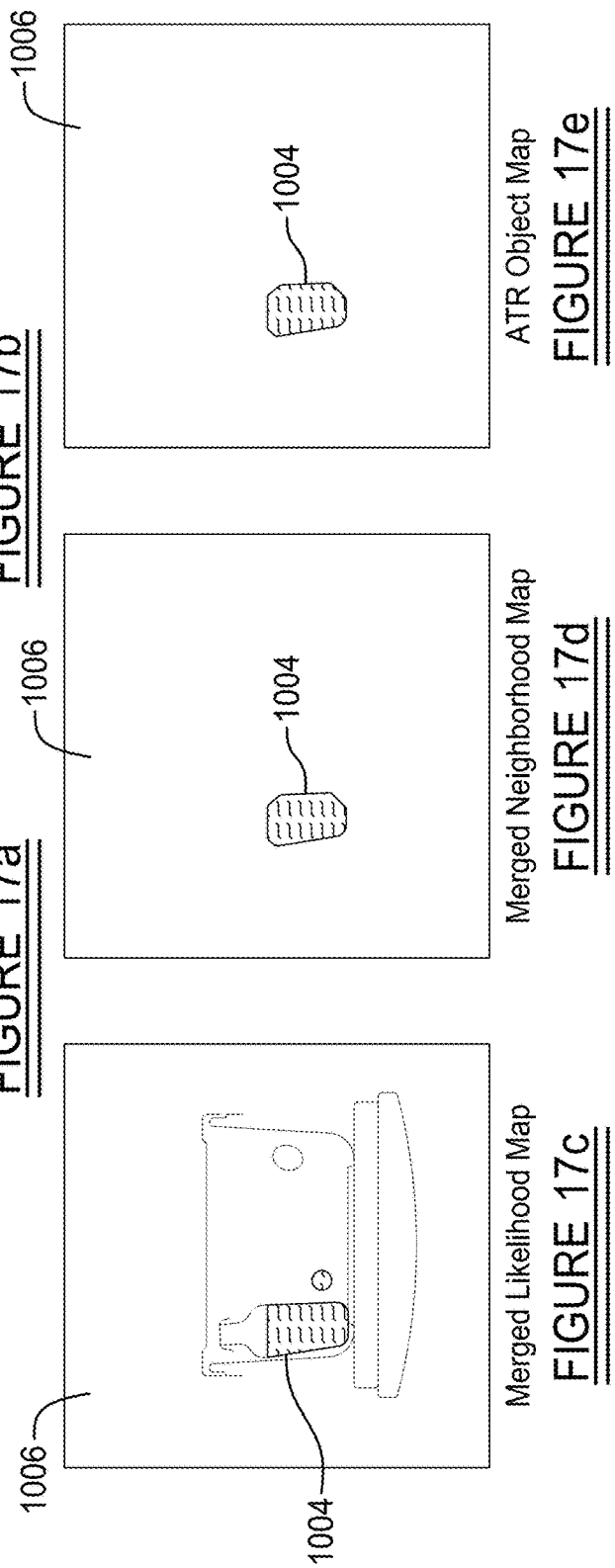
FIGURE 17a CT Image
FIGURE 17b Ground Truth Map
FIGURE 17c Merged Likelihood Map
FIGURE 17d Merged Neighborhood Map
FIGURE 17e ATR Object Map
Saline: 1004 Slice 200
0: non-MOI — 1006
1: Clay — 1000
2: Rubber — 1002
3: Saline — 1004

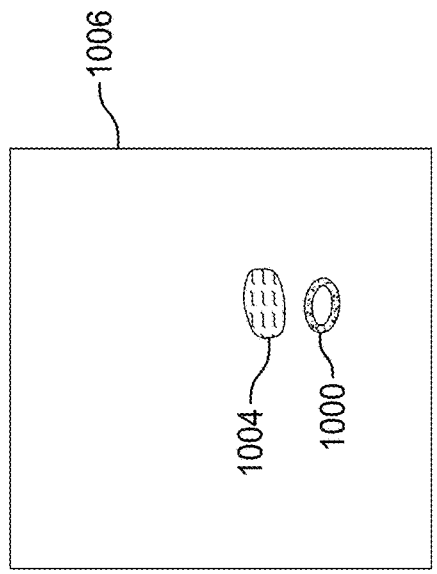
FIGURE 18a — CT Image
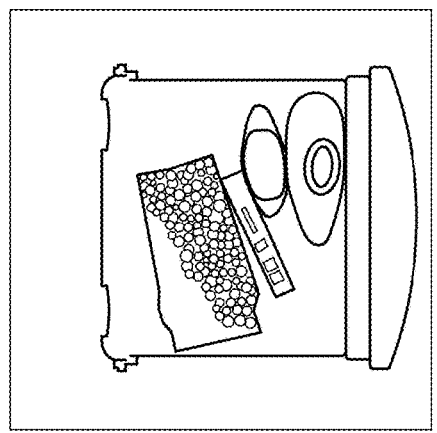
FIGURE 18b — Ground Truth Map
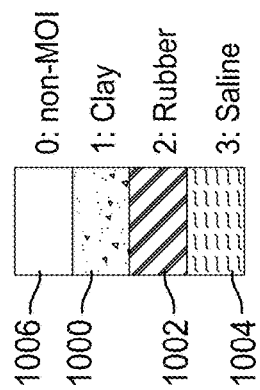
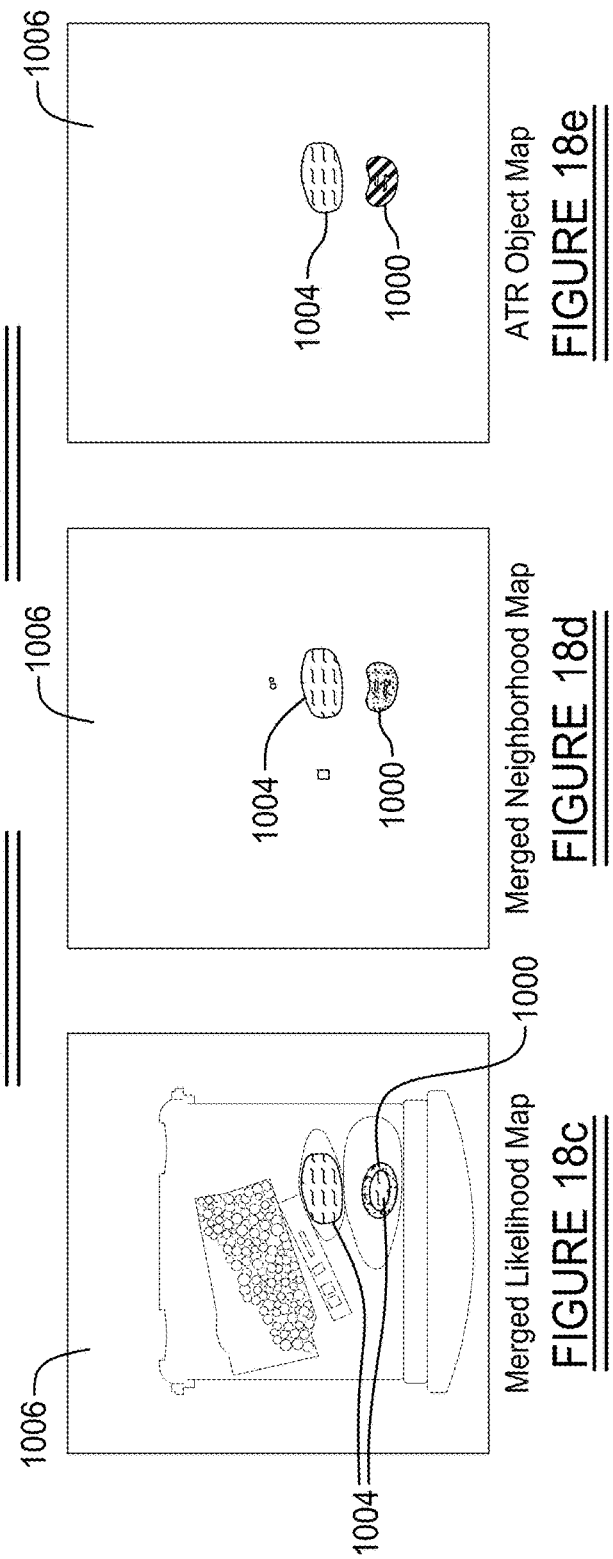
FIGURE 18c — Merged Likelihood Map
FIGURE 18d — Merged Neighborhood Map
FIGURE 18e — ATR Object Map Rubber + Saline: I057 Slice 50
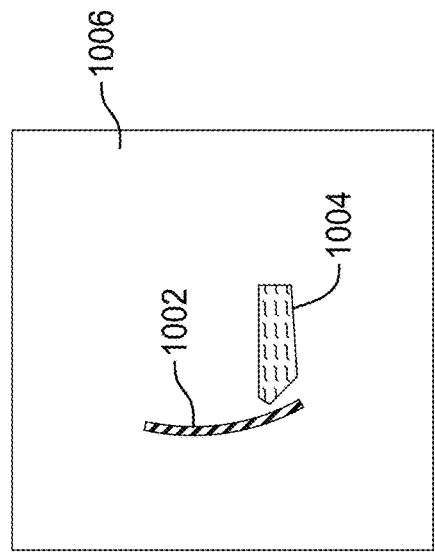
CT Image
FIGURE 19a
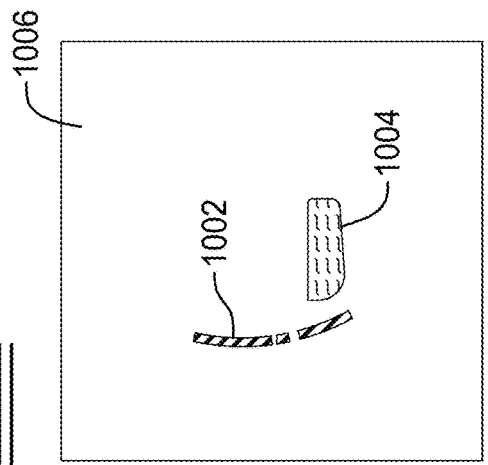
Ground Truth Map
FIGURE 19b
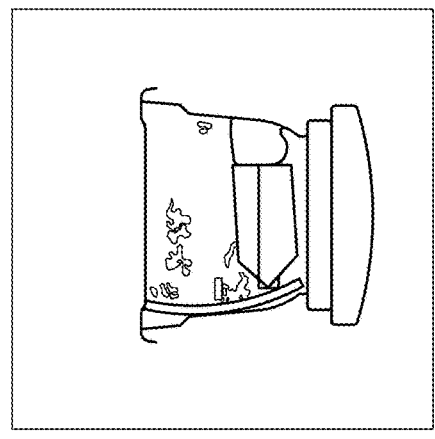
Merged Likelihood Map
FIGURE 19c
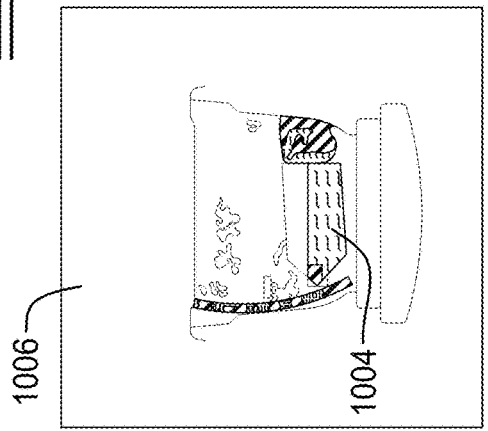
Merged Neighborhood Map
FIGURE 19d
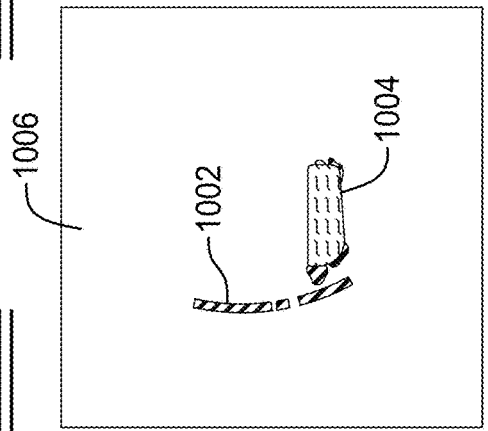
ATR Object Map
FIGURE 19e
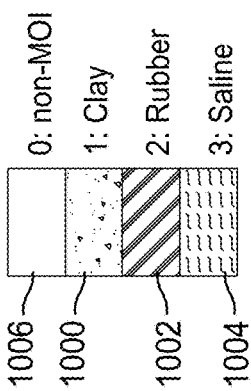
0: non-MOI
1: Clay
2: Rubber
3: Saline

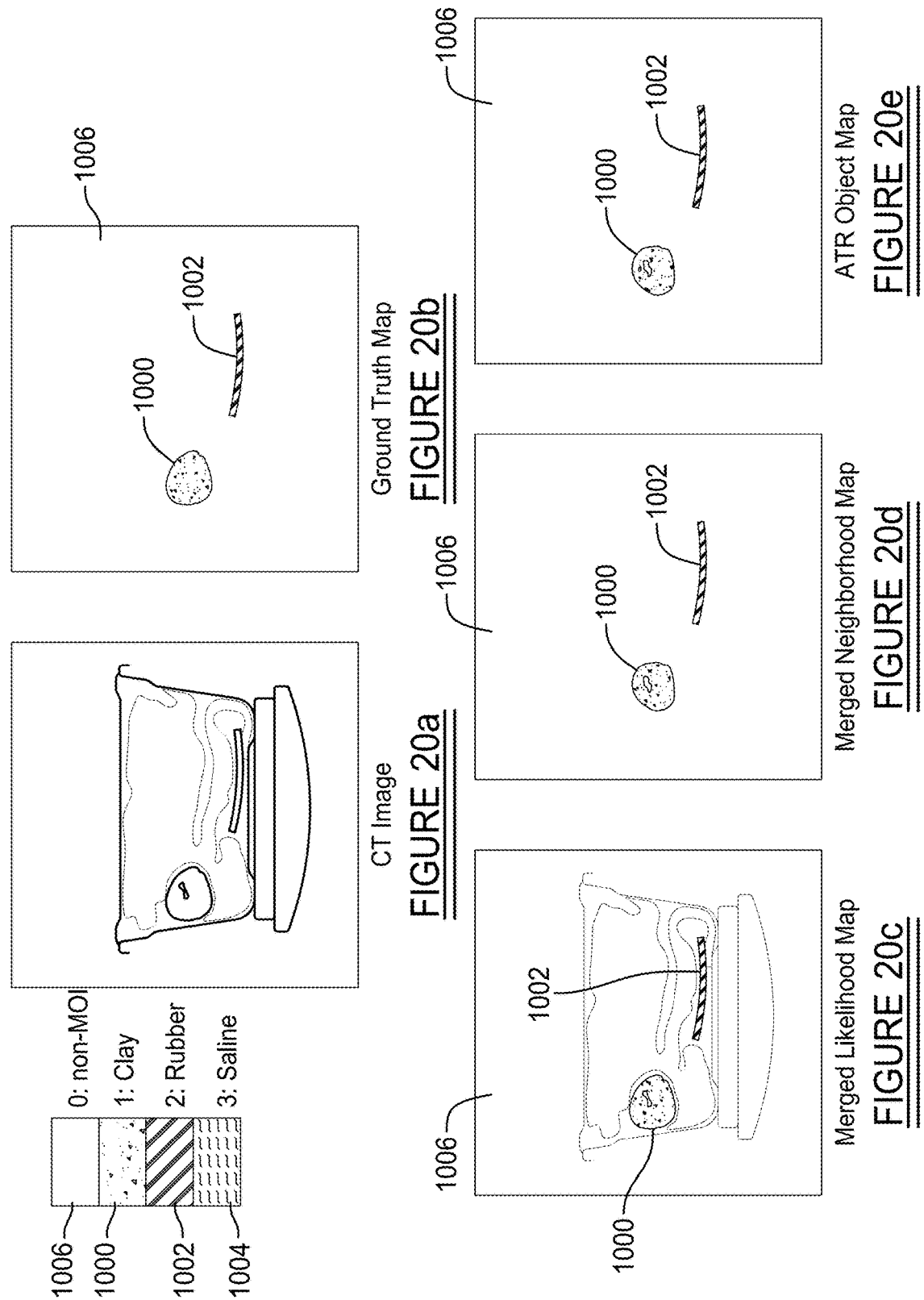

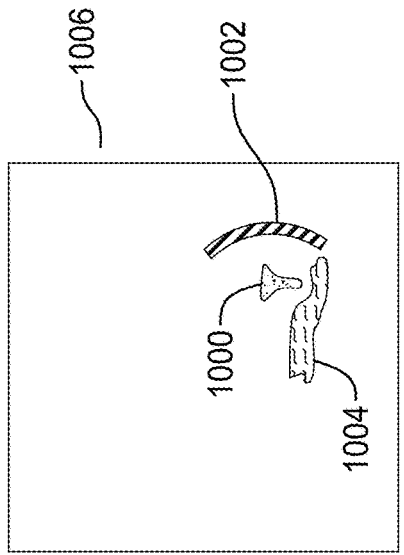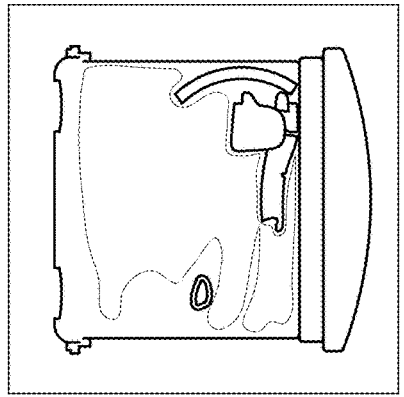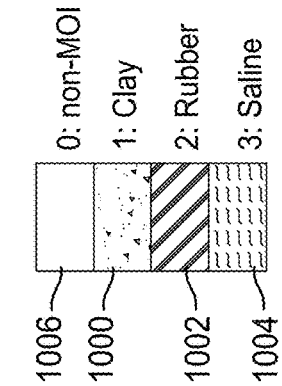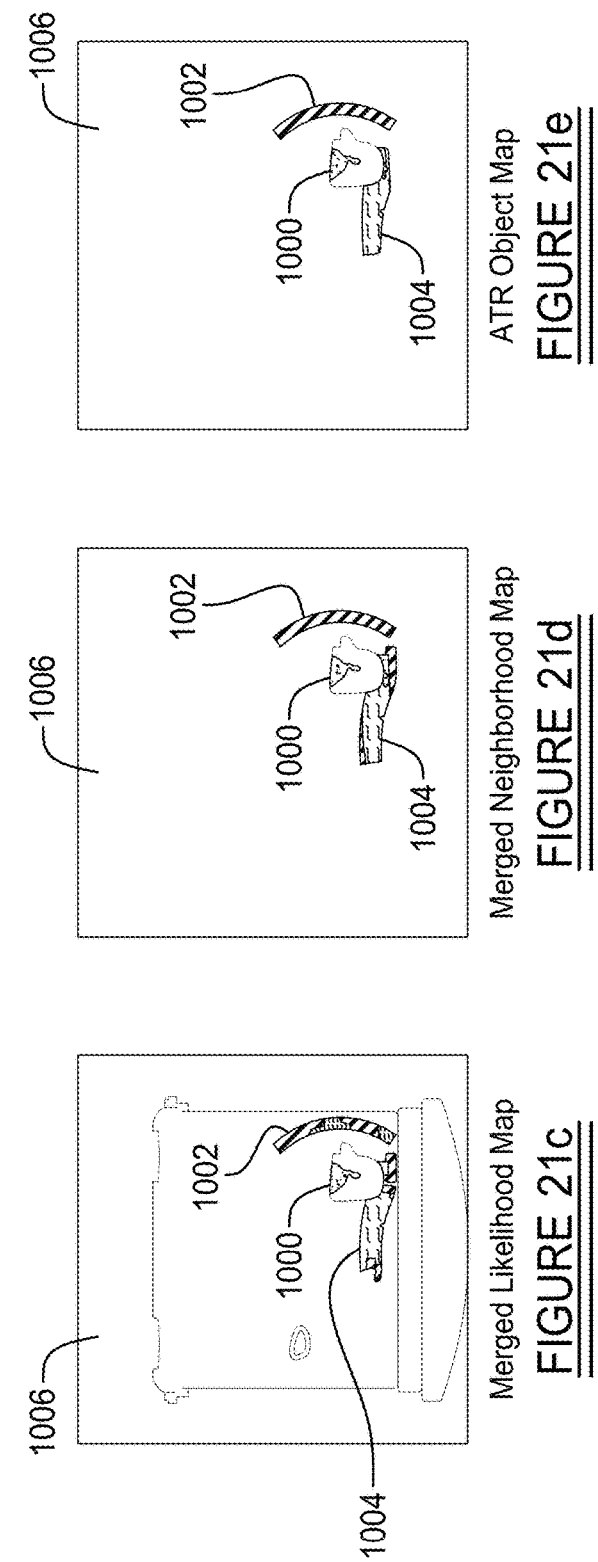

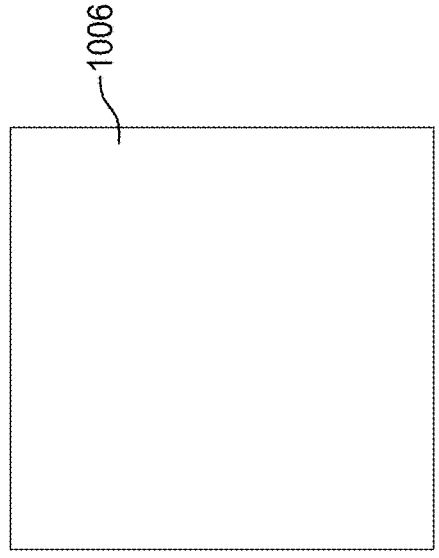
CT Image
FIGURE 22a
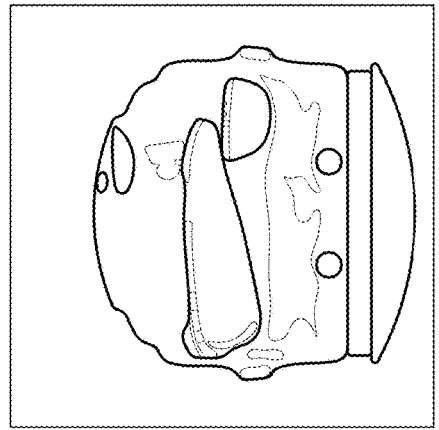
Ground Truth Map
FIGURE 22b
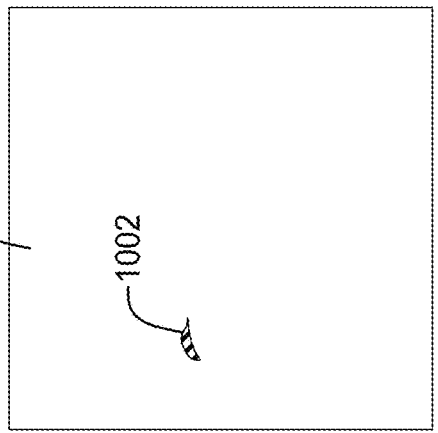
Merged Likelihood Map
FIGURE 22c
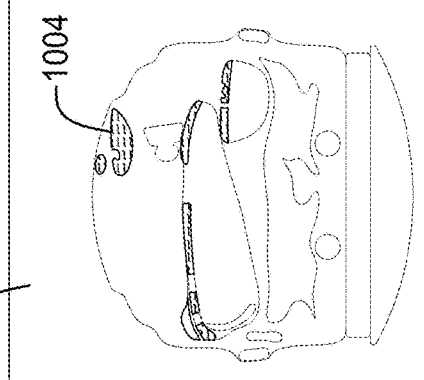
Merged Neighborhood Map
FIGURE 22d
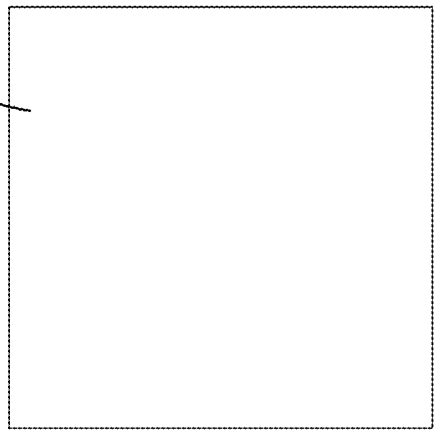
ATR Object Map
FIGURE 22e
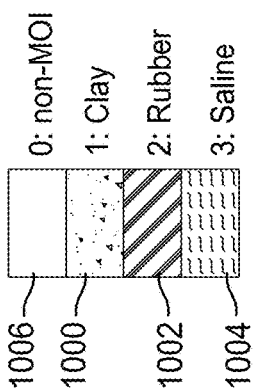
0: non-MOI
1: Clay
2: Rubber
3: Saline

SYSTEM AND METHOD FOR IDENTIFYING OBJECTS OF INTEREST IN IMAGES BASED ON LIKELIHOOD MAP DECLUTTERING

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates to x-ray systems and methods for visually inspecting for contraband items in baggage such as suitcases, boxes, containers, purses, laptop cases, and carry-on bags, particularly at locations such as airports, and more particularly to a three dimensional computed tomography inspection system and accompanying software for even more reliably identifying contraband items and items of interest in such baggage, with a significantly reduced degree of false positive object identifications. It also relates to x-ray systems and methods for detecting void and crack defects in CT images of manufactured components.

BACKGROUND

The statements in this section merely provide background information related to the present disclosure and may not constitute prior art.

Systems that produce x-ray images have widely varying applications. One such application is contraband and threat detection, for the purpose of protecting the public. For example, x-ray scanning devices are used widely at airports around the world to protect travelers by scanning carry-on and checked bags for potential threats, for example, explosives or contraband such as handguns, knives, etc. For carry-on bags, such systems typically produce an image in two dimensions (2D), which limits their effectiveness in being able to produce images of complexly shaped items enabling quick and reliable detection of such items as explosives, weapons or contraband items, or to verify that items being viewed are not contraband.

X-ray inspection systems also have important uses in manufacturing applications for quickly detecting defects (e.g., cracks or voids) in parts, which would be difficult or impossible to detect with the naked eye.

Computed tomography (CT) scanners have been used in medical applications for some time. CT scanners provide a significant advantage over conventional 2D x-ray systems in that CT scanners produce 3D x-ray images. CT has also been used to obtain images of industrial parts/assemblies and baggage in 3D. While CT scanners are currently used for inspecting checked bags at airports, there is some belief that widespread adoption of CT scanners for also inspecting carry-on bags may provide a path towards increasing the probability of detecting threats while reducing the number of false alarms, and thus expedite the carry-on inspection process at airports, and in fact, they are being deployed and tested today. Moreover, by using dual energy as opposed to single energy scanners, the automatic threat recognition (ATR) software packaged with the scanner can be expected to even better discriminate objects in bags based on material composition, and not just shape.

The traditional approach to ATR when using CT images of baggage is to extract objects by segmenting the CT image directly, extract object features, and classify objects based on their features. The success of this approach is limited by how well the segmentation algorithm is able to extract objects. Unfortunately, algorithms that perform image segmentation in three dimensions lack robustness. Put differently, such presently used image segmentation algorithms often may work well for some images but not others.

One way to improve robustness of image segmentation is to use physics to inform the process. The CT image is first transformed into an image whose voxel values represent likelihoods that the voxel contains certain materials of interest. This transformation highlights only those voxels (typically a small percentage) that the segmentation software should consider, and it facilitates separation of objects by material type. However, each likelihood value is based solely on the value of an individual voxel. Unfortunately, when an ATR is informed by physics in this way, its ability to distinguish multiple materials of interest is fundamentally limited. The problem becomes more severe when the number of materials of interest whose likelihood functions partially or greatly overlap grows. In this case, the various voxels in objects composed of a single material will often be classified as being composed of different but related materials. When this happens, the object can become highly fragmented and may thus go undetected.

From the above, it will be appreciated that stochastic methods serve to transform CT images into arrays (e.g., maps) of materials-of-interest ("MOI") likelihoods based on probability densities estimated from object-of-interest ("OOI") or "ground truth" voxels. These MOI likelihood maps are an important feature which function to highlight image voxels of potential relevance to objects-of-interest ("OOI") while deemphasizing the rest. However in practice, a limitation of likelihood maps is that they can be highly cluttered and can contain numerous false positive voxels (associated with confuser materials, partial volume effects, imaging artifacts, etc.). The likelihood functions of confuser materials overlap to a significant degree (e.g., because likelihood functions of two different material can overlap, those two materials could be confused for one another in a CT image). Segmentations of highly cluttered likelihood maps can thus contain many false positive objects and objects of interest that are either divided into fragments or improperly merged with other objects.

Accordingly, it would be highly desirable if an ATR system could be developed which significantly reduces the number of false positive objects identified in a likelihood map.

SUMMARY

This section provides a general summary of the disclosure, and is not a comprehensive disclosure of its full scope or all of its features.

In one aspect the present disclosure relates to an automatic contraband recognition system for scanning an article to identify an object of interest (OOI) contained within the article. The OOI may be at least one of a threat item or a contraband item, and the system makes use of a computed tomography (CT) scanner for scanning the article to obtain a CT image scan of the objects within the article, and wherein the reconstructed CT image is represented by a plurality of two dimensional (2D) image slices of the article and its contents. The system may comprise a computer which operates to obtain, from each said (2D) image slice, information forming a plurality of voxels making up the image slice. The computer is configured to receive the information and, for the voxels associated with the CT image, to use machine learning to analyze the voxels to create a likelihood map representing likelihoods that voxels making up the CT image are associated with a material of interest (MOI). The computer is further configured to analyze the likelihood map to construct neighborhoods of voxels within the likelihood map, and to use evaluations of the neighborhoods of voxels to declutter the likelihood map, and to connect voxels associated with the MOI together to form segments, and then to connect the segments together to help construct the OOI for visual identification.

In another aspect the present disclosure relates to an automatic threat recognition system for scanning an article to identify different objects of interest (OOI) contained within the article, wherein the system makes use of a computed tomography (CT) scanner for scanning the article to obtain a CT image scan of the objects within the article, and where the reconstructed CT image scan is represented by a plurality of two dimensional (2D) image slices of the article and its contents. The system may comprise a computer which receives each said (2D) image slice and obtains therefrom information forming a plurality of voxels representing each said image slice. The computer may be configured to use the voxels associated with each said CT image slice, in connection with a machine learning operation, to analyze the voxels to create likelihood maps, one for each MOI, representing likelihoods that voxels making up the CT image are associated with each one of said materials of interest (MOI). For each likelihood map, the computer is configured to analyze the voxels in the likelihood map by using moving average algorithms, in three dimensions, and computing engineered voxel neighborhood features, independent of cost and neighborhood size. The computer may also train a binary classification tree (BCT) to learn the neighborhood size and feature thresholds that jointly minimize discrepancy between a decluttered likelihood map and a ground truth map for the MOI. The computer may also be configured to declutter the likelihood maps by evaluating trained BCTs on vectors of likelihood map voxel neighborhood features. The computer may also be configured to merge the decluttered likelihood maps for the MOIs into a single disambiguated material map, and to connect voxels of a like MOI together to form segments, and to connect segments together to construct candidate OOIs to assist with rapid identification of the OOIs.

In another aspect the present disclosure relates to a method for identifying an object of interest (OOI) within an article, in an automated fashion. The method may comprise using a computed tomography (CT) scanner to scan the article to obtain a CT image scan of the objects within the article, the CT image scan represented by a plurality of two dimensional (2D) image slices of the article and its contents, wherein each said 2D image slice includes information forming a plurality of voxels. The method may further include using a computer configured to receive the information and, for the voxels associated with the CT image, to use machine learning to:

analyze the voxels to create a likelihood map representing likelihoods that voxels making up the CT image are associated with at least one material of interest (MOI); and analyze the likelihood map to construct neighborhoods of voxels within the likelihood map, and using evaluations of the neighborhoods of voxels to declutter the likelihood map, to connect voxels of a like MOI together into segments, and to connect the segment of a like MOI together to help construct candidate OOIs to help enable rapid identification of OOIs.

In still another aspect the present disclosure relates to an automatic inspection system for scanning a workpiece article to identify at least one of a void or crack in the workpiece, and where the system makes use of a computed tomography (CT) scanner for scanning the workpiece to produce a reconstructed CT image scan made up of a plurality of two dimensional (2D) image slices of the workpiece. The system comprises a computer which operates to obtain, from each said (2D) image slice, information forming a plurality of voxels making up the image slice. The computer is configured to receive the information and, for the voxels associated with the CT image, to use machine learning to analyze the voxels to create a likelihood map representing likelihoods that voxels making up the CT image are associated with a void or crack. The computer is further configured to analyze the likelihood map to construct neighborhoods of voxels within the likelihood map, and to use evaluations of the neighborhoods of voxels to declutter the likelihood map, to connect voxels associated with the MOI together to form segments, wherein the segments indicate at least one of a void or a crack in the workpiece.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings, in which:

FIG. 3a again shows a CT image slice from FIG. 2a;

FIG. 3b shows a ground truth image slice for the image slice of FIG. 3a;

FIG. 3c shows a slice of the corresponding ATR object alarm image for the slice shown in FIG. 3a;

FIG. 6 is a high level block diagram of a methodology for forming an ATR for objects of interest, in this example airport baggage, that uses parameters learned at voxel neighborhood, object and bag levels;

FIGS. 11a1-11c3 are graphs showing binary classification tree training results (i.e., error probability, detection probability and false alarm probability) on labeled voxel neighborhoods from likelihood maps for various materials of interest;

FIGS. 12a-12c are illustrations of binary classification trees for features of voxel neighborhoods trained on likelihood maps for clay (FIG. 12a), rubber (FIG. 12b) and saline (FIG. 12c);

FIG. 13 is a table showing neighborhood halfwidth (in voxels) for the fewest training errors for clay, rubber and saline, along with their corresponding error probability, detection probability and false alarm probability on training data;

FIG. 14 is a table showing examples of features that may be computed for segments;

FIGS. 15a-15e show images of a single slice of a CT scan image that contains just clay (FIG. 15a), a corresponding ground truth map (FIG. 15b), a corresponding merged likelihood map (FIG. 15c), a corresponding merged neighborhood map (FIG. 15d) and a corresponding ATR object map (FIG. 15e);

FIGS. 16a-16e show a single CT image slice that contains just rubber (FIG. 16a), a corresponding ground truth map (FIG. 16b), a corresponding merged likelihood map (FIG. 16c), a corresponding merged neighborhood map (FIG. 16d) and a corresponding ATR object map (FIG. 16e);

FIGS. 17a-17e show a single CT image slice that contains just saline (FIG. 17a), a corresponding ground truth map (FIG. 17b), a corresponding merged likelihood map (FIG. 17c), a corresponding merged neighborhood map (FIG. 17d) and a corresponding ATR object map (FIG. 17e);

FIGS. 18a-18e show a single CT image slice that contains clay and saline (FIG. 18a), a corresponding ground truth map (FIG. 18b), a corresponding merged likelihood map (FIG. 18c), a corresponding merged neighborhood map (FIG. 18d) and a corresponding ATR object map (FIG. 18e);

FIGS. 19a-19e show a single CT image slice that contains rubber and saline (FIG. 19a), a corresponding ground truth map (FIG. 19b), a corresponding merged likelihood map (FIG. 19c), a corresponding merged neighborhood map (FIG. 19d) and a corresponding ATR object map (FIG. 19e);

FIGS. 20a-20e show an image of a single slice of a CT scan that contains clay and rubber (FIG. 20a), a corresponding ground truth map (FIG. 20b), a merged likelihood map (FIG. 20c), a merged neighborhood map (FIG. 20d) and an ATR object map (FIG. 20e);

FIGS. 21a-21e show images of a single slice of a CT scan that contains clay, rubber and saline (FIG. 21a), a corresponding ground truth map (FIG. 21b), a corresponding merged likelihood map (FIG. 21c), a corresponding merged neighborhood map (FIG. 21d) and a corresponding ATR object map (FIG. 21e); and FIGS. 22a-22e show images of a single slice of a CT scan with no objects of interest (FIG. 22a), a corresponding ground truth map (FIG. 22b), a corresponding merged likelihood map (FIG. 22c), a corresponding merged neighborhood map (FIG. 22d) and a corresponding ATR object map (FIG. 22e).

DETAILED DESCRIPTION

Example embodiments will now be described more fully with reference to the accompanying drawings.

The present disclosure relates to an automated inspection system 10 which is well suited for both threat/contraband detection, as well as in manufacturing applications for detecting cracks, voids and related defects in parts being manufactured. Merely for convenience, the following discussion will be focused more around the threat/contraband recognition/detection implementation of the system and method, and the automated inspection system will be referred to throughout the following discussion simply as the "ATR system 10".

Figure 1:
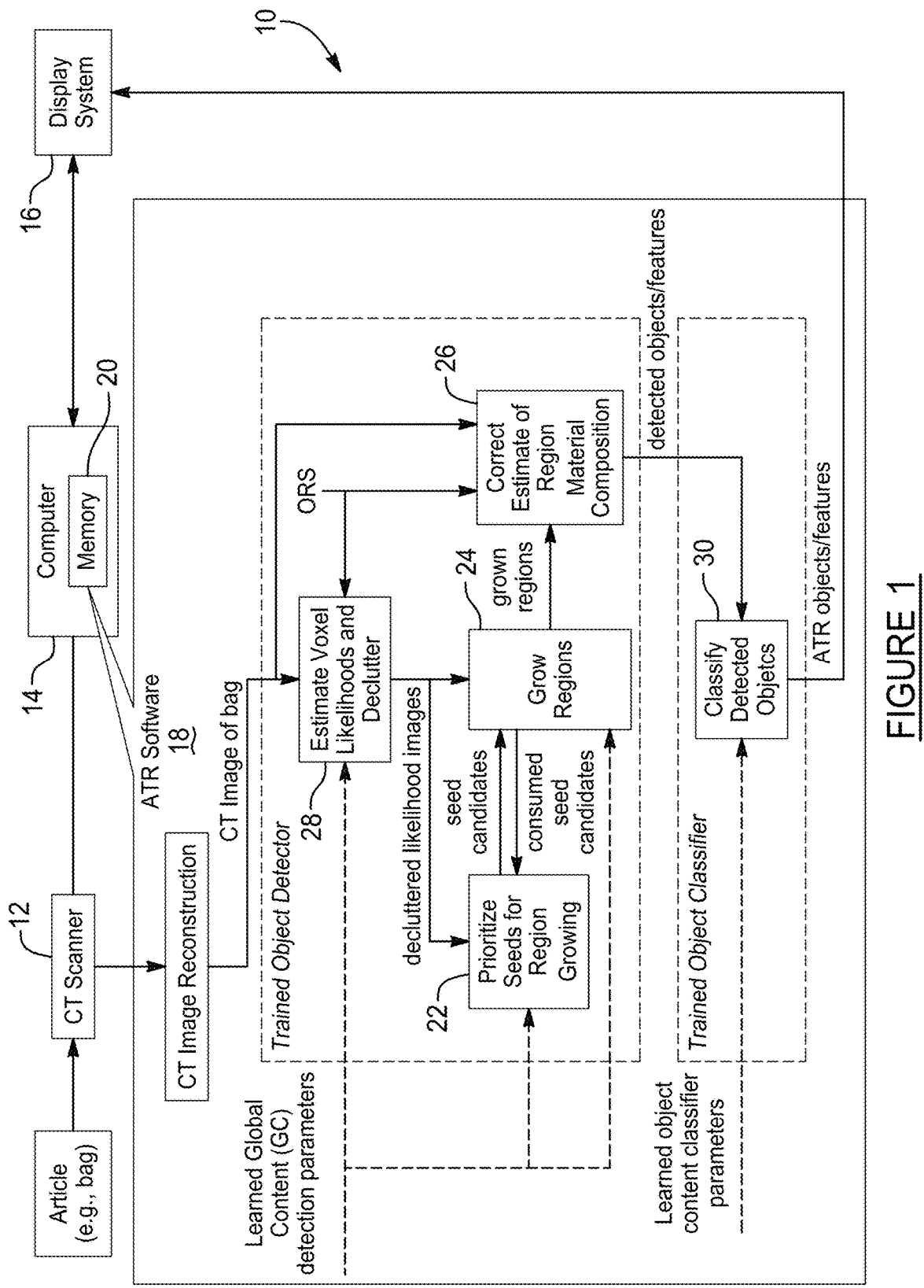
FIG. 1 is a high level block diagram of one example of an ATR system in accordance with the present disclosure, which is informed by learned parameters for interacting global context mechanisms and object context mechanisms by interacting spatial context mechanisms at a plurality of levels including a bag, a training set and object levels.

FIG. 1 shows one embodiment of the ATR system 10 and its related method of operation. The ATR system 10 and method is especially well suited for detecting contraband or threat items, and items of interest, in bags, boxes and other types of containers where the contents may not be readily visually discernable. And as noted above, the system 10 is not limited to applications for detecting threat/contraband items, but can be used in manufacturing or inspection applications for inspecting workpieces and components for voids/cracks and related defects or abnormalities.

The ATR system 10 overcomes the limitations imposed by local spatial context on ATR performance by using a plurality of global spatial context mechanisms. In this example the ATR system 10 may include a CT scanner 12, a computer 14 and a display system 16 (e.g., LCD, LED, CRT, etc.). An ATR software module 18 (hereinafter "ATR software 18") may be stored in a non-volatile memory 20 (e.g., RAM, ROM, etc.) of the computer 14. The ATR software 18 may implement three software mechanisms or modules (i.e., software sub modules) for the global spatial context mechanisms, including 1) a "prioritize seeds for region growing" module 22 (hereinafter "PSRG module 22"), a Grow Regions module 24 (hereinafter "GR module 24"), a module for correcting the estimate of region material composition 26 (hereinafter the "CERMC module 26"). Additional modules/mechanisms may include a module for estimating voxel likelihoods and decluttering 28 (hereinafter simply "EVLD module 28", which also forms a global spatial context mechanism) and a module for classifying detected objects 28 (hereinafter "CDO module 28") as "threat" vs. "non-threat". The ATR system 10 is informed by interactions of modules 22-28, which constitute "global context" mechanisms, as well as CDO module 30, which constitutes an "object context" mechanism. A more detailed description of the operation of each of the modules 22-28 will now be presented.

Using Learned Parameters to Declutter Images of Alarm Voxels (EVLD Module 28)

For an x-ray CT image with voxels v(x,y,z) at column x and row y in slice z, the value v is a scalar for single energy scanners and a 2×1 vector for dual energy scanners. In the single energy case, v is typically a linear attenuation coefficient (LAC) $\mu$ for a single energy. In the dual energy case, v may represent a pair of LACs ($\mu_L, \mu_M$) at low and high energies, a pair of system independent rho Z (SIRZ) coefficients ($\rho_e, Z_e$) representing effective electron density and atomic number, a pair of synthesized monochromatic basis (SMB) coefficients ($\mu'_L, \mu'_H$), etc.

The material composition and physical feature characteristics for the objects of interest (OOIs) in baggage may be captured in an object requirements specification (ORS). The physical features of interest (FOIs) apply to object spatial context, for example, both the object and its surround. For explosives detection, the FOIs are typically not shape specific because explosives can come in almost any shape and size. Examples of possible FOIs for explosives include mass, thickness, texture, concealment (which reflects proximity to higher attenuating materials), etc. One may have access to CT training images with companion ground truth data that identifies the CT image voxels associated with specific materials of interest (MOIs). In this case, a likelihood function $p(v|M_k)$ can be approximated for each MOI $M_k$, k=1 ... $n_{MOI}$ by fitting a curve in 1D or surface in 2D to the sample probability density function (PDF) derived from CT image voxels associated with that MOI (discussed further in connection with FIG. 2g). Note that the domain of $p(v|M_k)$ lies in the space of the voxel modality (e.g., a SIRZ, SMB or LAC space). If no ground truth is available, one may have to settle for an estimate of a rectangular region of responsibility (ROR) within voxel space that provides an estimate of the area over which $p(v|M_k)$ is nonzero. In this case, an estimate of $p(v|M_k)$ can be approximated by fitting a curve or surface to the ROR (discussed further in connection with FIG. 2g).

For the voxel at (x,y,z), one can compute an alarm value, $$a_k(x, y, z) = \hat{p}(v(x, y, z) | M_k) \triangleq p(v(x, y, z) | M_k) \Big/ \max_v p(v | M_k), \quad \text{Equation 1a}$$

$$k = 1 \ldots n_{MOI}$$

for each MOI $M_k$ as a normalized likelihood value that varies from zero to one. Then for the background (non-MOI) case, $$a_0(x, y, z) = \begin{cases} 1 & \max_{k=1 \ldots n_{MOI}} a_k(x, y, z) = 0 \\ 0 & \text{otherwise} \end{cases} \quad \text{Equation 1b}$$

Since the variance of voxels values in a CT image over a MOI sample can be large relative to the domain of the MOI likelihood, one may wish to smooth the CT image prior to estimating likelihoods. Smoothing is a form of consensus relaxation in that it provides a neighborhood consensus of likelihood estimates for each voxel. Note that the alarm value in (1a) can be computed in other ways (e.g., as a posterior estimate).

For each MOI, the alarm image $a_k(x,y,z)$ is decluttered prior to region growing. The goal of decluttering is to improve object detection performance by reducing the number of small objects while separating larger objects that barely touch each other. Decluttering can be achieved by applying n iterations of annihilation (analogous to morphological erosion) followed by n iterations of restoration (analogous to morphological dilation) separately to each 3D alarm image $a_k(x,y,z)$. Only certain voxel aggregations that were not completely annihilated will be restored. Voxel (x,y,z) in $a_k(x,y,z)$ is annihilated (set to zero) if the mean of $a_k$ values (from the previous iteration of annihilation) within the $n_x \times n_y \times n_z$ neighborhood of (x,y,z) is $\leq a_{annihilate}$. Voxel (x,y,z) in $a_k(x,y,z)$ is restored (returned to its original value) if the mean of $a_k$ values (from the previous iteration of restoration) is $>a_{restore}$. $a_{restore}$ is typically less than $a_{annihilate}$ to make restoration easier than annihilation. For decluttering, the global context (GC) parameters that can be prescribed or potentially learned are thus the number of declutter iterations (n), the dimensions $n_x \times n_y \times n_z$ of the neighborhood (analogous to the morphological structuring element), and the annihilation/restoration parameters $a_{annihilate}$ and $a_{restore}$.

The best alarm and best MOI images (for the most likely MOI on a per voxel basis) are computed from decluttered alarm images for the individual MOIs as $$M(x, y, z) = \qquad \text{Equation 2}$$
$$\begin{cases} \arg\max_{k=1 \ldots n_{MOI}} p(v(x, y, z) | M_k) & \max_{k=1 \ldots n_{MOI}} p(v(x, y, z) | M_k) > 0 \\ 0 & \text{otherwise} \end{cases}$$

$$p(x, y, z) = \begin{cases} p(v(x, y, z) | M(x, y, z)) & M(x, y, z) > 0 \\ 0 & \text{otherwise} \end{cases} \quad \text{Equation 3}$$

$$a(x, y, z) = p(x, y, z) \Big/ \max_v p(v | M(x, y, z)) \quad \text{Equation 4}$$

Figure 2A:
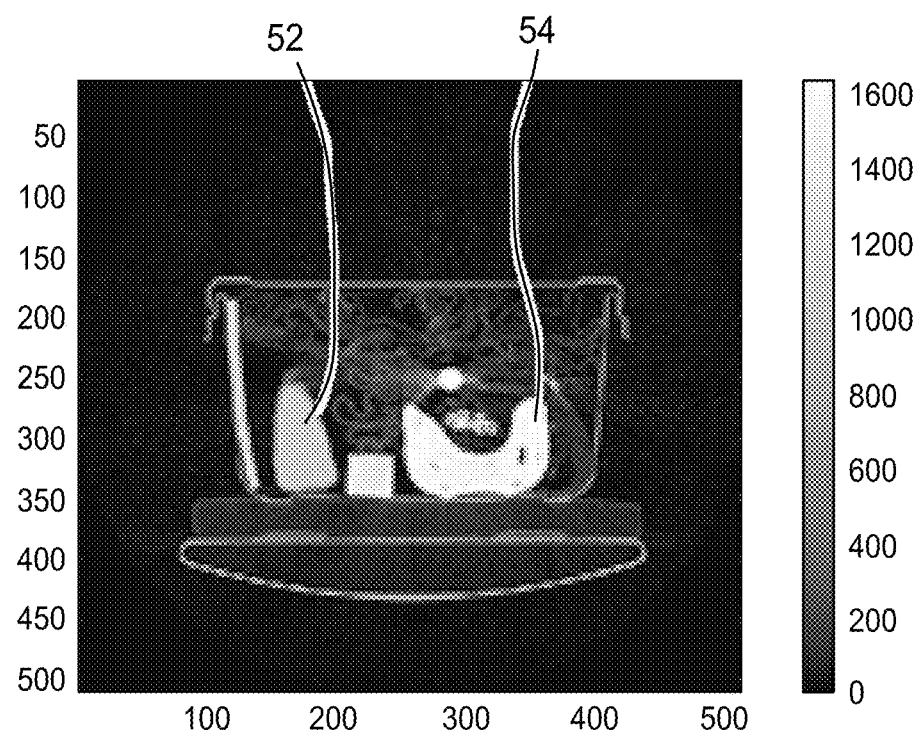
FIG. 2a shows one slice of a single energy CT image.
Figure 2B:
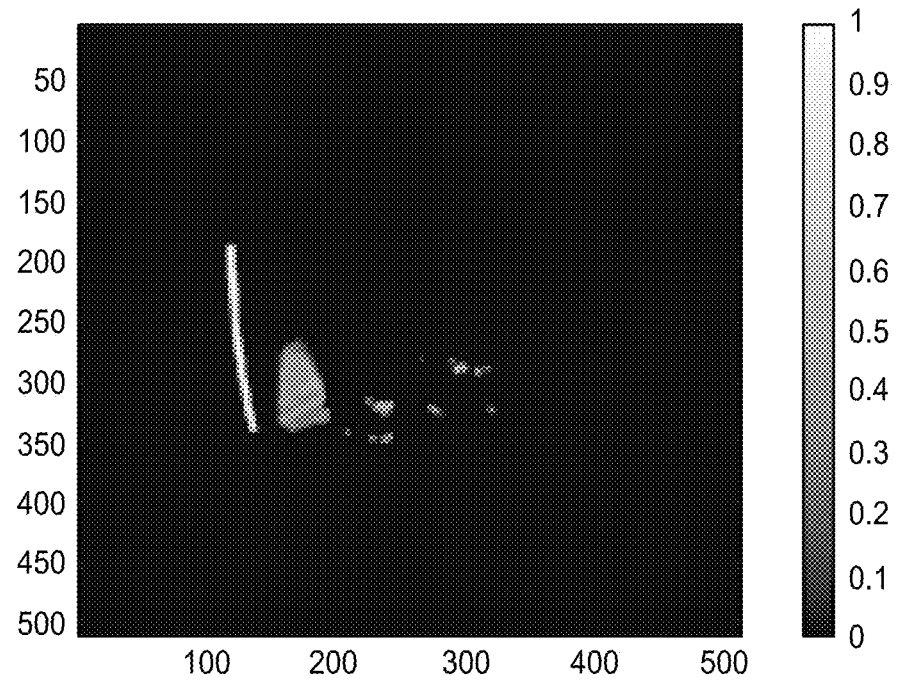
FIGS. 2b-2d show decluttered alarm images for saline, rubber and clay, respectively.
Figure 2C:
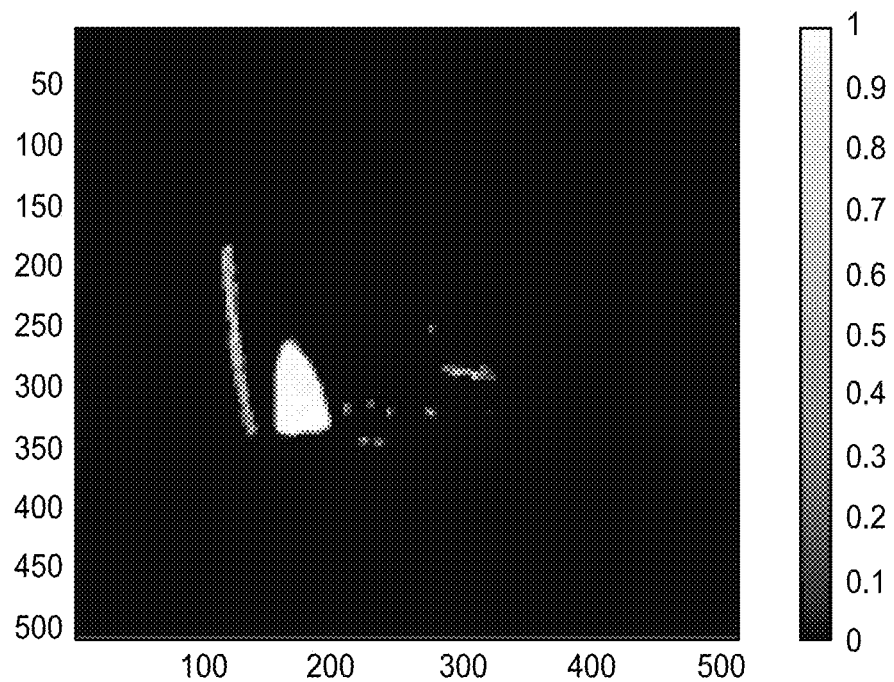
Figure 2D:
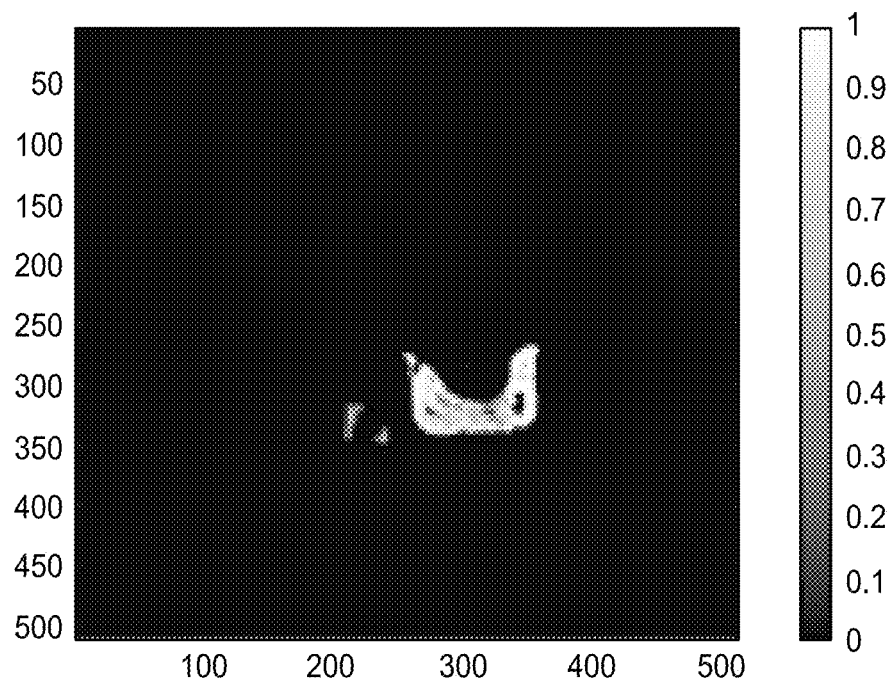
Figure 2E:
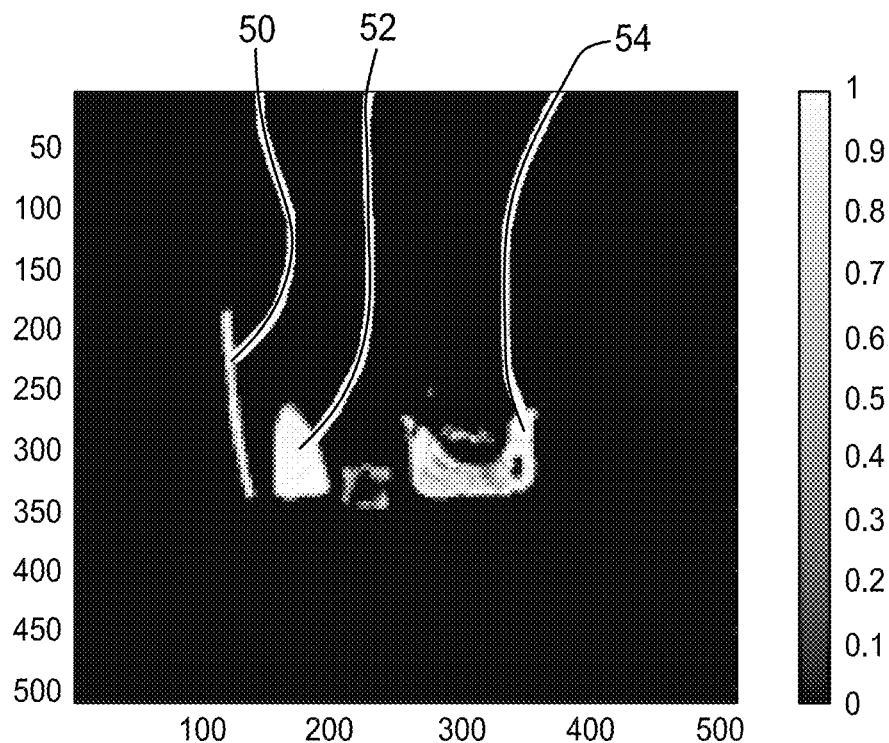
FIG. 2e shows the best alarm image constructed from the images of FIGS. 2b-2d.
Figure 2F:
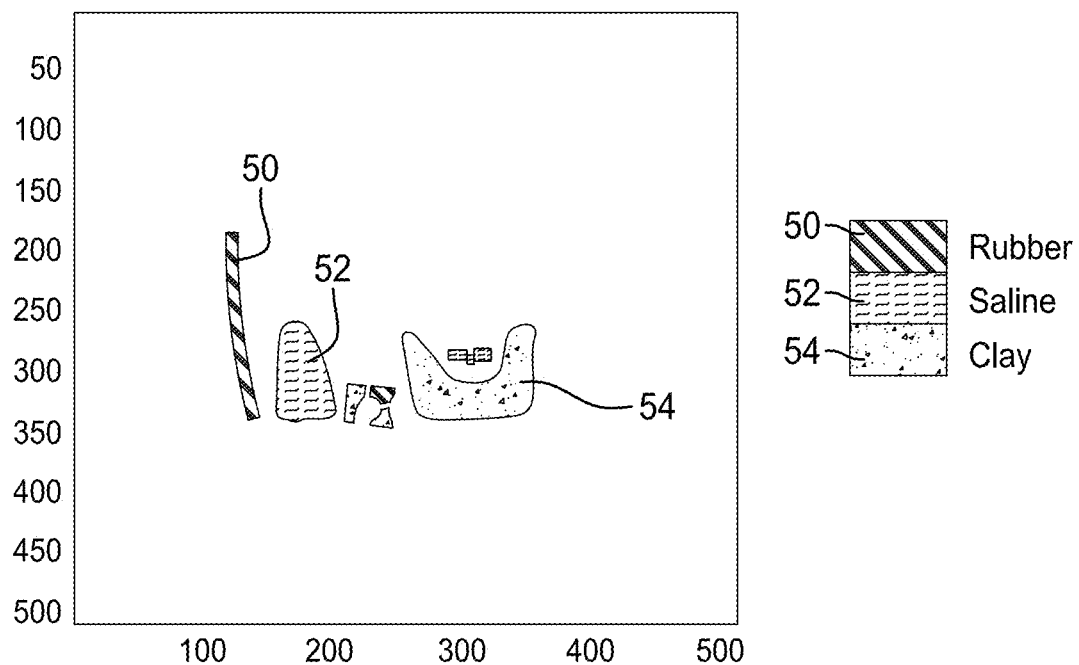
FIG. 2f illustrates the best MOI image.

FIG. 2a shows one slice of a single energy CT image. FIGS. 2b, 2c and 2d show the decluttered alarm images $a_k(x,y,z)$ associated with three MOIs 50, 52 and 54. FIG. 2e shows the best alarm image a(x,y,z) and FIG. 2f shows the best MOI image M(x,y,z), in which MOI 50 is rubber, MOI 52 is saline and MOI 54 is clay. Note that the alarm value of a voxel could be based on a posterior estimate (as opposed to a likelihood estimate), in which case p(v|M) would be replaced by the posterior P(M|v) in (2)-(3) and a(x,y,z)=p(x,y,z) in (4). The posterior P(M|v) is the probability that voxel with value v is composed of material M.

Prioritizing Seeds for Region Growing with Learned Constraints (PSRG Module 22)

Alarm values at (x,y,z) are based solely on local context (i.e. solely on the values of CT image voxels within the consensus relaxation neighborhood of (x,y,z)). When there are multiple MOIs, there is a chance that the likelihood functions for at least some of them will overlap, and this chance will tend to increase as the number of MOIs grows. The material compositions of certain voxels can become ambiguous when the likelihood functions for different MOIs overlap. Such ambiguity is problematic because it can lead to highly fragmented objects and missed detections.

Ambiguity in material type may be handled by selecting a seed voxel and associating the best MOI explanation of the seed voxel with all voxels in the region grown from that seed. The region associated with seed voxel ($x_s, y_s, z_s$) is thus grown not in the CT image, but instead in the 3D image $a_k(x,y,z)$ of voxel alarm values for which k=M($x_s, y_s, z_s$) is the ID of the best MOI explanation for the seed voxel. Seed voxel candidates (x,y,z) are prioritized in descending order of likelihood p(x,y,z) for the best MOI explanation. The voxels for which p(x,y,z)>0 are sorted in descending order of likelihood value. Voxels with large likelihood values are stronger candidates as seeds for region growing than voxels with smaller likelihood values. However, voxels v(x,y,z) for which the alarm value a(x,y,z) in Equation 4 (a normalized likelihood value from zero to one) is less than $a_{seed,min}$ are removed from the list of candidate seeds. For seed prioritization, the global context parameter that can be prescribed or potentially learned is thus the lower bound $a_{seed,min}$ on seed voxel alarm values.

Region Growing with Learned Constraints (GR Module 24)

Using GR module 24, regions may be grown using connected component analysis on voxel neighborhoods of some size (typically 3×3×3). More precisely, a voxel (x,y,z) is added to the region grown from seed voxel $(x_s,y_s,z_s)$ if it lies within a predetermined neighborhood, for example within the 3×3×3 neighborhood, of some voxel that was previously added to the region, and it was not consumed by a different region, and $$a_k(x, y, z) \geq \beta_k a_k(x_s, y_s, z_s) \quad \text{Equation 5}$$

for some region growth constraint factor $0<\beta_k\leq 1$. As region growing progresses, seed voxels are chosen from among those voxels (x,y,z): $a(x,y,z)>a_{seed,min}$ that were not previously consumed by a grown region. Thus, while the nominal set of candidate seed voxels is the set of all voxels for which $a(x,y,z)>a_{seed,min}$, the set of candidate seed voxels can diminish as regions are grown.

From Equation 5, it is clear that the decision threshold on voxel alarm value for region growing depends not only on the MOI type of the seed (through $\beta_k$, which varies with MOI type k), but also on the likelihood value of the seed voxel in the alarm image for MOI k (through $a_k(x_s,y_s,z_s)$, which for a given MOI type k, varies with seed voxel location). In other words, the decision threshold on voxel alarm value for region growing varies not only from MOI to MOI, but also from region to region for a given MOI. For region growing, the global context parameters to be prescribed or potentially learned are the region growth constraint factors $\beta_k$ for the various MOIs k. One could constrain the values of these constraint factors to be the same for all k.

Correcting Errors in Estimates of Object/Region Material Composition (CERMC Module 26)

Using CERMC module 26, the supervoxel associated with a grown region is obtained by computing the mean of CT image values over all voxels in that object. The most likely material explanation for the supervoxel can be different than for the seed voxel. When this happens, the estimate of object material composition is based on the supervoxel and not the seed voxel. Objects for which MOI 0 is the best explanation of the supervoxel are eliminated because they most likely either contain some material that is not on the list of MOIs or are part of the background.

Using a Trained Classifier to Identify Objects of Interest (CDO Module 30)

For each detected object (or segment) s, there is an associated vector of object context features f(s). Examples of object context (OC) features for OOIs that contain explosives include mass, thickness, concealment (which reflects proximity to higher attenuating materials), and MOI score (the alarm value for the object supervoxel, which is based on object material composition). Object context features may draw from both the object (e.g., mass) and its surround (e.g., concealment).

One could consider the OC parameters to be the set of minimal values for the OC features that optimizes ATR system 10 performance. For any detected object s whose OC features satisfy the constraints imposed by these parameters, one could then define the ATR score A(s) (from zero to one) as the MOI score for s. Alternatively, one could envision some widely used type of trained classifier (e.g., a 3-layer perceptron, a support vector classifier, a random forest, etc.) that returns a decision d(s) (one for "OOI" vs. zero for "not OOI") and an ATR score A(s) (from zero to one). The parameters of this classifier would be the OC parameters.

The image of ATR alarm objects contains voxels of value zero in the background and voxels of value A(s) within alarm object s. The displayed monochromatic brightness of an ATR alarm object in such an image will thus be proportional to the likelihood (or potentially the probability) that the object actually contains some material of interest. FIG. 3a shows the same slice of the CT image from FIG. 2a next to the ground truth for that slice (FIG. 3b) and the corresponding ATR object alarm image (FIG. 3c).

Learning the Global and Object Context Parameters

The learned global context (GC) parameters apply to the ATR system 10 (i.e., the trained object detector) of FIG. 1. For any candidate set g of GC parameter values, there is an optimal set x(g) of object context (OC) parameter values that apply to the trained object classifier (FIG. 1). Once the GC parameters g have been specified, the OC parameters x(g) can be quickly learned from training data. One option would be to consider a set of candidate minimal values for the OC features and search over that set to identify those candidate OC parameter values (bounds on OC feature values) that optimize ATR performance. Another option would be to construct a training set of OC features f for objects labeled as positive (of interest) vs. negative (not of interest). This training set would be obtained by comparing the objects detected in training images using specified GC parameters g to ground truth objects. Feature vectors associated with true positive objects would be labeled as "of interest". Feature vectors associated with false positive objects would be labeled as "not of interest". This training set would be used to train a traditional classifier (e.g., a 3-layer perceptron, a support vector classifier, a random forest, etc.) that would return a classification statistic or ATR score for each detected object.

Figure 4:
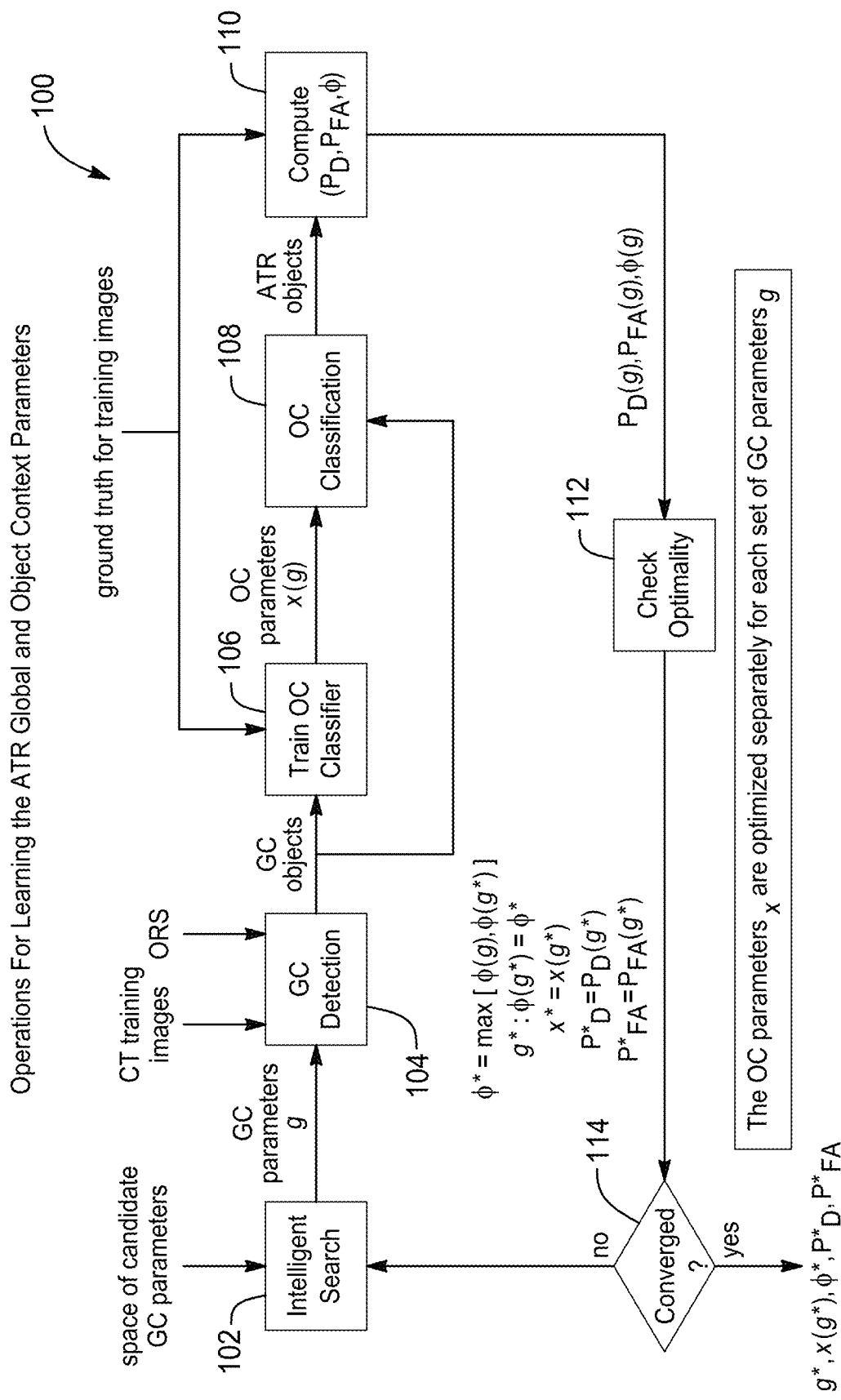
FIG. 4 is a flow diagram of operations performed for learning the ATR global and object context parameters used by various modules of the ATR system.

FIG. 4 shows a block diagram of a methodology 100 of operations which may be performed for off-line training by an ATR training system to learn the jointly optimal parameters [g*, x(g*)] from CT images of training bags (operation 104), ground truth for those bags (operations 106-110) and an ORS. For each set of candidate GC parameters g, object detection must be applied to every training image using an intelligent search operation 102. The amount of time it takes to learn g* and x(g*) from training data (operations 104 and 106) is thus proportional to the number of candidate sets g of GC parameters in the search space and the size of the training set. For a given training set, the keys to fast parameter learning are thus to minimize the number of GC parameters and to use intelligent search operation 102. Intelligent search becomes critically important as the number of GC parameters grows because exhaustive grid search suffers from the curse of dimensionality (the number of candidate sets of parameters g grows exponentially with the number of parameters). The number of GC parameters to learn can be reduced by using prescribed values for parameters whose values are expected to have lower impact on detection performance. If the number of GC parameters is still significant, intelligent search methods, such as random search, Bayesian optimization, gradient-based optimization and evolutionary optimization can be much more efficient than exhaustive search.

For a given candidate set [g, x(g)] of ATR parameters, one can compute the detection and false alarm probabilities $P_D(g)$ and $P_{FA}(g)$, at operation 110. The objective function $$\Phi(g) = P_D(g)/[1 + kP_{FA}(g)] \quad \text{Equation 6}$$

is maximized by maximizing $P_D(g)$ and minimizing $P_{FA}(g)$ simultaneously. The training algorithm, which is associated with operation 112, computes the solution to the equation $$g^* = \arg\max_g \phi(g) \quad \text{Equation 7}$$

In Equation 6, 0<k<1 if false positives are less critical than true positives, k=1 if true and false positives are equally important, and k>1 if false positives are more critical than true positives. Operation 114 checks to see if the next candidate parameters in the intelligent search improved upon (PD,PFA) relative to previous candidate parameters, which helps to establish convergence.

Approximated Likelihood functions for Individual MOIs

The transformation in Equations 1-4 from CT image voxels v(x,y,z) to alarm values $a(x,y,z) \in (0,1)$ depends on likelihood function estimates $p(v|M_k)$ for the various MOIs $M_k$. The ATR alarm object grown from seed voxel $v_{seed}$ is grown in the image $a_k(x,y,z)$ of voxel alarm values, where k is the ID of the most likely MOI explanation for $v_{seed}$. ATR performance is thus sensitive to the likelihood function estimates $p(v|M_k)$.

Ideally, there would be exactly one distinct characteristic voxel value in the CT image for each MOI $M_k$. In this case, $p(v|M_k)$ would be a delta function at a distinct location in the space spanned by all possible values for CT image voxels v. However, in real CT images, $p(v|M_k)$ will typically have some nonzero spread about a single peak. MOIs $M_k$ are easier to distinguish when the peaks of their likelihood functions are more widely separated and the likelihood functions are more narrow.

Unfortunately, narrow likelihood functions can lead to alarm images in which the variance of a(x,y,z) values within an object that contains MOI $M_k$ is large (significantly greater than zero). Large variances make it harder to grow regions associated with distinct OOIs. To reduce this variance, one can widen the likelihood function for each MOI $M_k$ so that varies more slowly within an appropriate range of the peak location. Such likelihood functions lead to images a(x,y,z) of alarm values that are more homogeneous within OOIs and which are thus easier to segment.

Figure 2G:
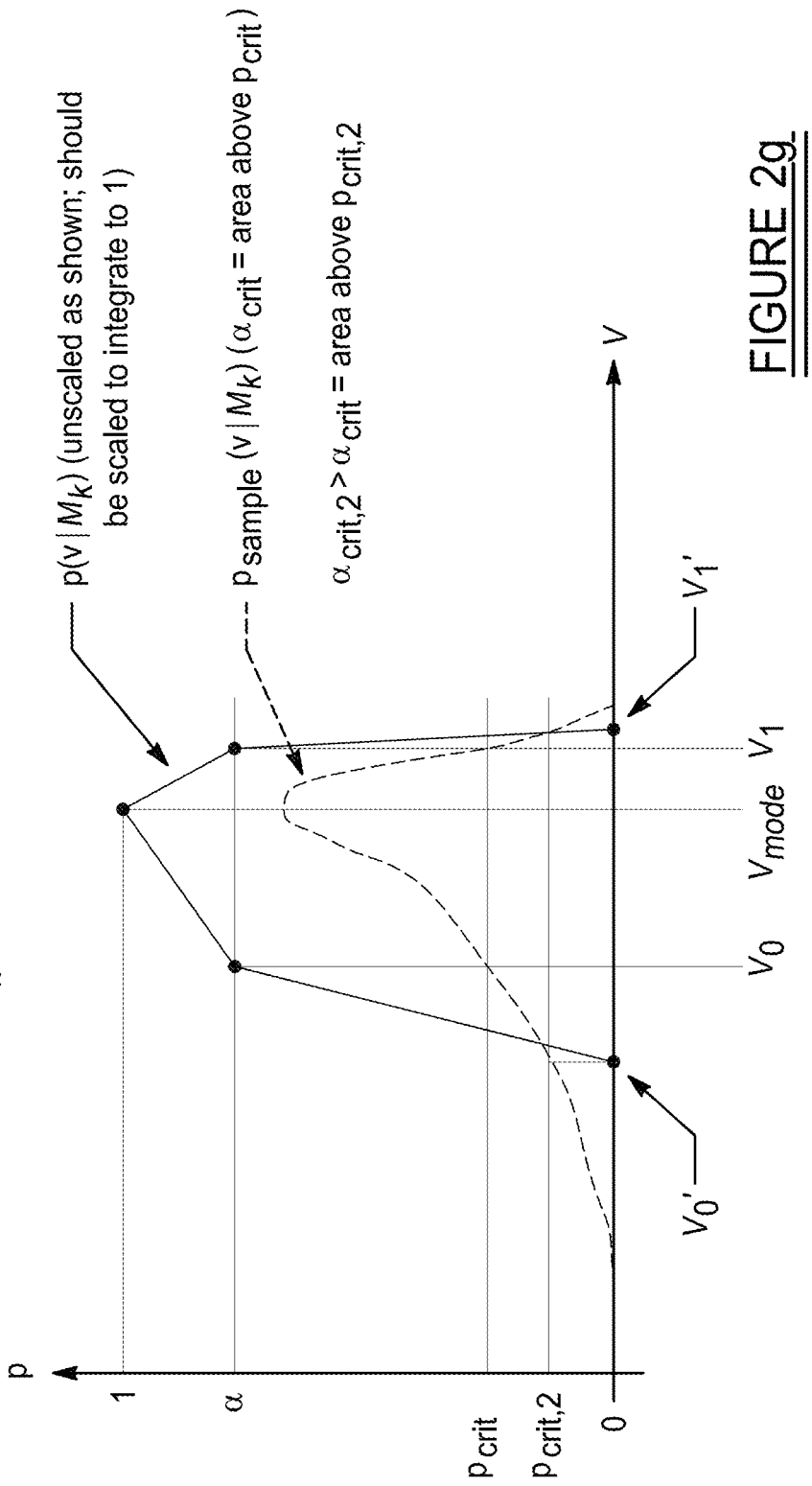
FIG. 2g illustrates a graph to help illustrate a geometry for approximating a widened piecewise linear likelihood function for a MOI $M_k$ in one dimension.

FIG. 2g illustrates a method for widening a likelihood function $p(v|M_k)$ for MOI $M_k$ based on an initial estimate of the likelihood function (the sample likelihood function). The illustration, while provided in one dimension for clarity and simplicity, readily extends to two dimensions. As described above, the goal is to widen the likelihood function $p(v|M_k)$ to enable the ATR to more easily extract distinct OOIs composed of material $M_k$ from images $a_k(x,y,z)$ of alarm values for MOI $M_k$. The initial estimate is either a sample PDF for voxels composed of material $M_k$ derived from training data or an ROR supplied for material $M_k$. If an ROR is supplied, the sample PDF is taken as a uniform PDF fit to the ROR. Otherwise, the sample PDF $p_{sample}(v|M_k)$ derived from training data is used.

First, the mode $v_{mode}$ of the sample PDF is located (for the case of RORs, the mode is chosen as the center of the ROR). The value $p_{crit}$ is computed above which some fraction $\alpha_{crit}$ of the area or volume under the sample PDF curve or surface lies. In one dimension, the first points $v_0$ and $v_1$ to either side of the mode at which the horizontal line $p=p_{crit}$ intersects the sample PDF is then found. In two dimensions, the contour that contains the mode and whose perimeter consists only of those points on the sample PDF surface for which $p=p_{crit}$ is found. $p(v_{mode}|M_k)$ is set to unity. In one dimension, $p(v_0|M_k)=p(v_1|M_k)$ is set to some value $\propto \in [0,1]$. In our case, $\propto$ should be close to unity (say $\propto=0.8$) so that the approximated likelihood will vary slowly within the interval from $v_0$ to $v_1$ about the mode. In two dimensions, $p(v|M_k)$ is set to $\propto$ at each contour point v.

As shown in FIG. 2g, for one dimension, the interval $[v_0, v_1]$ that contains the mode is extended to $[v'_0, v'_1]$ such that $p_{sample}(v'_0|M_k)=p_{sample}(v'_1|M_k)=p_{crit,2}$ and $p(v'_0|M_k)=p(v'_1|M_k)$ is set to zero. The value $p_{crit,2}<p_{crit}$ is computed above which some fraction $\alpha_{crit,2}>\alpha_{crit}$ of the area or volume under the sample PDF curve or surface lies. The five vertices are then connected to produce an approximated piecewise linear likelihood function $p(v|M_k)$ which is then scaled so that it integrates to one. In two dimensions, the a contour is extended outward to the level set for which $p_{sample}(v|M_k)=p_{crit,2}$, and at every such point v, $p(v|M_k)$ is set to zero. A continuous surface is then fit to the mode of value one, the contour points of value a and the extended contour points of value zero. The surface is then scaled so that the volume under the surface is unity.

Figure 5:
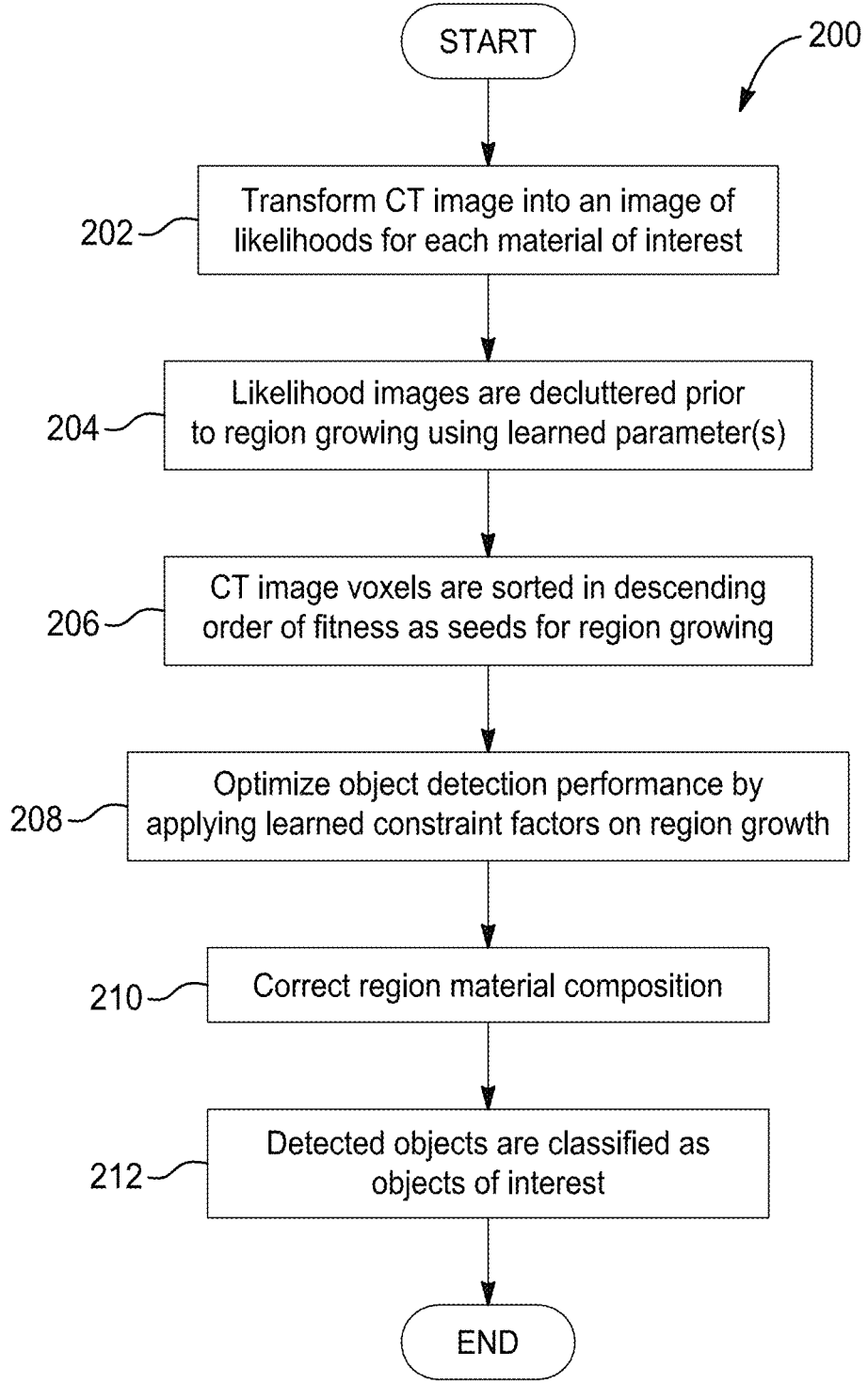
FIG. 5 is a flowchart providing a high level summary of operations performed by the ATR system of FIG. 1.

Referring now to FIG. 5, a flowchart 200 is shown to summarize, at a high level, major operations performed by the various modules of the system 10 shown in FIG. 1. From FIG. 5, initially at operation 202, the CT image is transformed into an image of likelihoods for each material of interest. At operation 204, as noted herein, an important operation is decluttering likelihood images prior to region growing for optimal object detection performance. This is accomplished by EVLD module 28 using learned declutter parameters. At operation 206 the PSRG module 22 selects seed voxels for region growing. This is accomplished by sorting CT image voxels in descending order of fitness as prioritized seed candidates for region growing. Voxel fitness is proportional to the likelihood that a voxel contains some material of interest (MOI). Detection performance can be optimized by learning the minimum fitness level for a voxel to qualify as a seed. The assumed material composition of a region grown from a seed voxel is the most likely material composition of the seed voxel itself. Candidate seed voxels consumed by a previously grown region are removed from the list of candidates. At operation 208, region growth is limited by learned constraint factors.

At operation 210 the GR module 24 is used as the global context mechanism for correcting region material composition. Each voxel in each region is assigned the ID of the most likely material explanation of its supervoxel (i.e., the mean of all voxels in the region). At operation 212 the CDO module 30 is used as the object context mechanism for classifying detected objects as objects of interest. This is accomplished by classifying detected objects as objects of interest (OOIs) by applying a classifier to vectors of object spatial context features. The classifier is trained for optimal performance. For example, objects can be classified as threat vs. non-threat based on a combination of MOI likelihood, mass and thickness. If these quantities are too small, the classifier will output a low probability of threat. If they are all within expected limits for threats, the classifier will output a higher probability of threat.

Neighborhood Maps

As noted hereinbefore, one type of transformation may be performed to map CT image voxel values to MOI likelihoods, resulting in one likelihood map (LM) per MOI. However, one important limitation of this process is that MOI likelihood values are computed within the spatial context of a single voxel. Like CT voxel values, LM voxel values are subject to statistical fluctuations that can lead to a significant degree of uncertainty and to LMs that are highly cluttered. Even worse, when the likelihood functions associated with the different MOIs overlap and one attempts to merge the LMs associated with those MOIs into a single LM, significant confusion (i.e., ambiguity) as to object material composition is often introduced. Segmentations of highly cluttered LMs often contain many false positive objects and objects of interest that are either divided into fragments or improperly merged with other objects. Also, the material compositions estimated for the segments are often incorrect. Robust segmentations of such LMs are difficult to achieve in practice.

Referring now to FIG. 6, another image segmentation and decluttering methodology 300 is shown for use with the ATR system 10 of FIG. 1 in a high level block diagram form, which even further improves the ability to reduce false positive objects in a likelihood map. The image segmentation and decluttering methodology 300 shown in FIG. 6 introduces an entirely new way to improve image segmentation performance, and uses machine learning. It has been found that segmentation can be significantly facilitated by first transforming the CT image into decluttered images within which only voxels of potential interest are highlighted, while the rest are de-emphasized. The methodology 304 uses a bank of trained classifiers (one per MOI) to transform a CT image into a set of decluttered LMs that we refer to as neighborhood maps (NMs), one per threat type, that is, one for each material (MOI) that may comprise a threat.

As shown at operation 302 in FIG. 6, the methodology 300 first transforms the CT image into a set of likelihood maps, one per threat type. Thus, the methodology 300 is repeated for each threat type to obtain a corresponding likelihood map for each specific threat type. The value of a voxel in the likelihood map at operation 302 represents the likelihood that the voxel contains a given substance which one is interested in (i.e., the material-of-interest or MOI, such as an explosive substance) associated with a specific threat type. This likelihood value obtained at operation 302 is obtained by mapping a CT voxel of value v to $\tilde{p}(v|M_k)$ (the value of the likelihood function for MOI $M_k$ normalized to the range [0,1]). The likelihood function $p(v|M_k)$ for MOI $M_k$ may be estimated from training bag data and the associated ground truth maps. The methodology 300 then declutters the likelihood map for MOI $M_k$ to produce a neighborhood map $NM_k$, at operation 304. Neighborhood map voxels are computed as follows: The neighborhood centered on each voxel in the likelihood map for MOI $M_k$ is first classified as either "of interest" or "not of interest". If classified as "of interest" and the voxel at the center of the neighborhood is nonzero in the likelihood map, that voxel is set to the mean of nonzero normalized likelihoods within its voxel neighborhood. Otherwise, it is set to zero. The neighborhood classifier is trained so that the neighborhood classification maps will resemble the ground truth maps (which reflect the true locations of the objects-of-interest) as much as possible within the set of training bags.

As shown in FIG. 6, the neighborhood classification maps created for each MOI at operation 304 are supplied as input to a "segment then feature extract then classify" pipeline, at operations 306-310. It will be appreciated that global context can, in principle, be introduced by training on the segmentation parameters for box 306. But in the present context, the input to the segmenter will be a material map (this is the output of operation 304, but is obscured in FIG. 6, apparent only in FIG. 7a). As such, there is no need for global context optimization here because the segmentation process has been reduced to a highly manageable problem (that is, it is easy to segment a material map, it is much more challenging to segment a CT image).

Figure 7A:
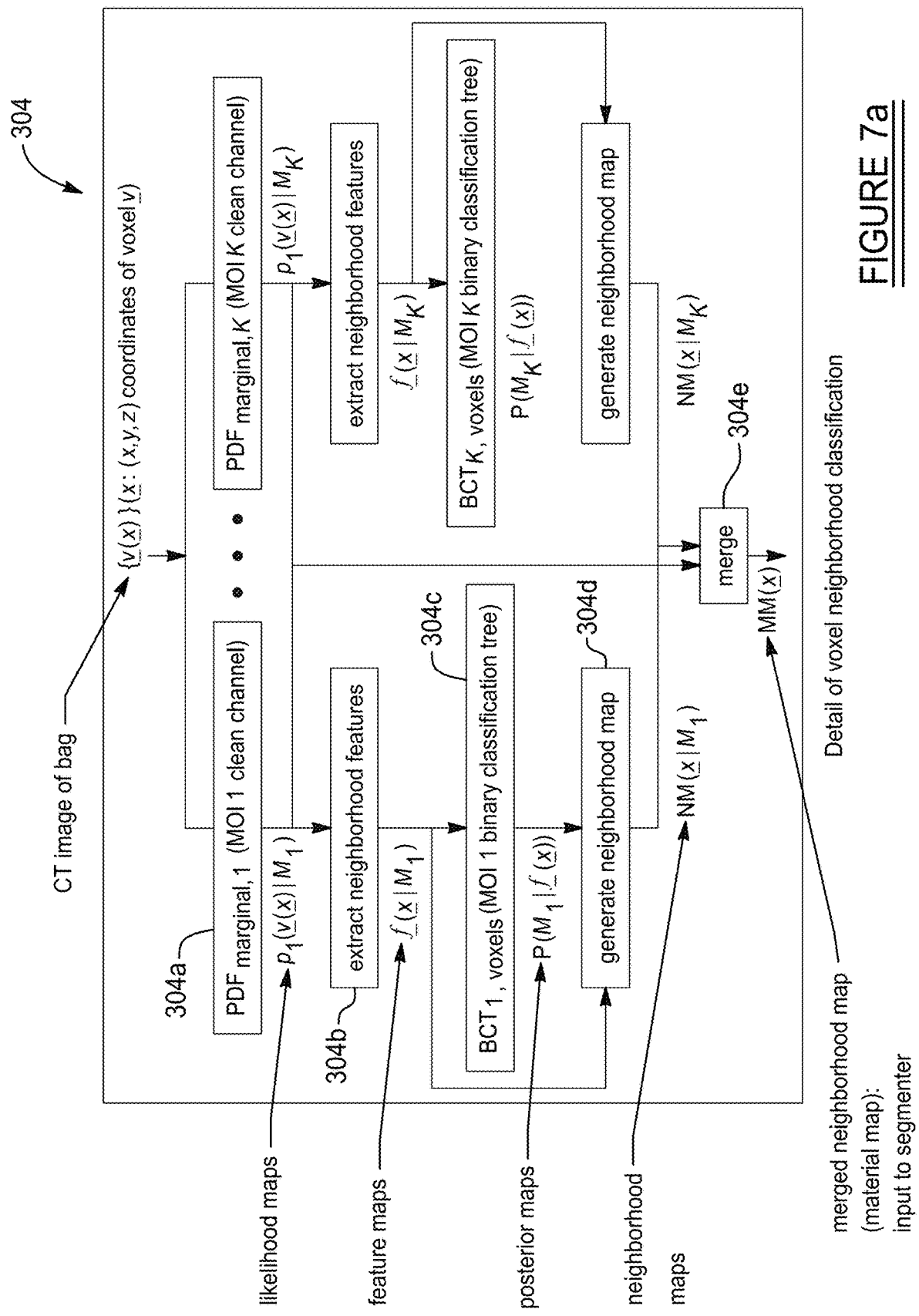
FIG. 7a is an even more detailed block diagram of operations performed by the "Classify Voxel Neighborhoods" operation in FIG. 6.

FIG. 7a shows a methodology which is an even more detailed breakdown of the sub-operations performed in the above-described operation 304 of FIG. 6. At operation 304a, likelihood maps are created from the CT image voxels in which a likelihood value is calculated for each voxel as to whether the voxel represents a specific MOI. At operation 304b, voxel neighborhood features are extracted from the likelihood map. At operation 304c, posterior maps are produced from the feature maps output from 304b. At operation 304d, the posterior maps created at operation 304c are transformed into neighborhood maps (NMs). At operation 304e the neighborhood maps for each MOI are merged into a single disambiguated material map (MM).

Figure 7B:
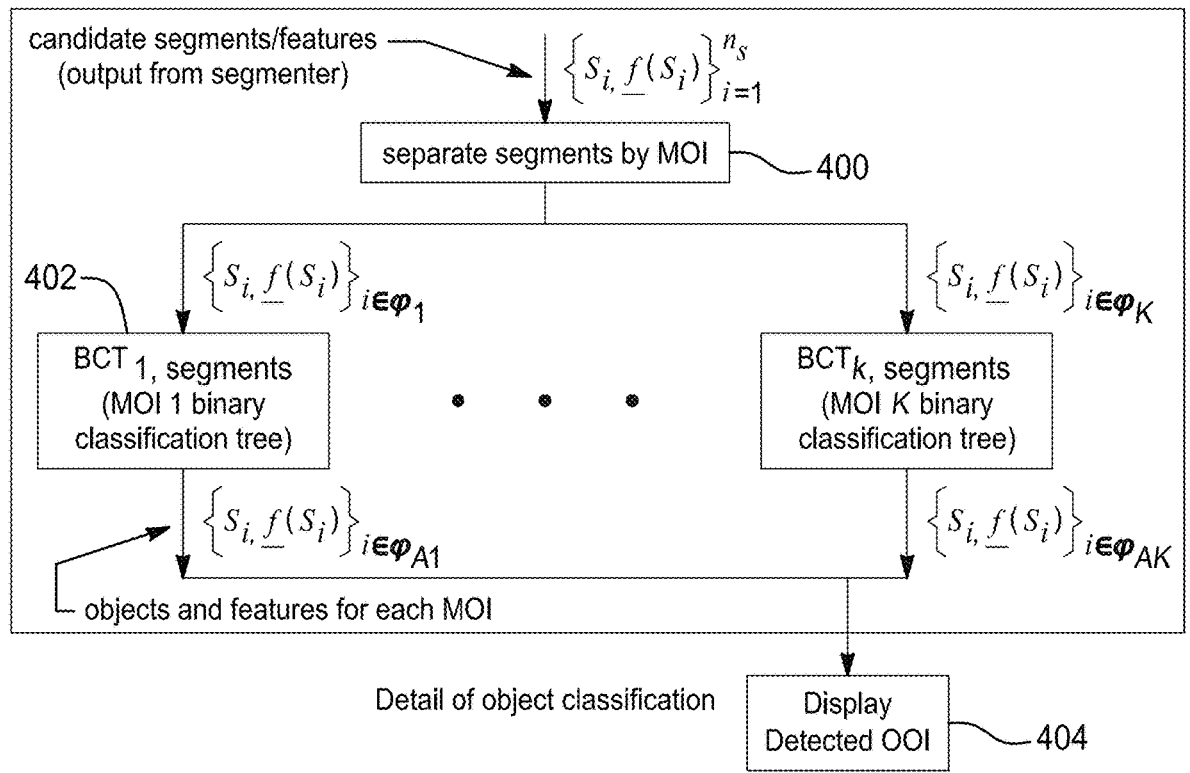
FIG. 7b is an even more detailed block diagram of operations performed by the "Classify Objects" operation of FIG. 6.

Referring to FIG. 7b, the sub-operations performed at operation 310 in FIG. 6 are described in greater detail. At operation 400, candidate segments and/or features generated pursuant to operations 306 and 308 in FIG. 6 are separated by MOI. At operation 402, the vectors of features for candidate segments input to the classifier for each MOI are classified as "threat" vs. "non-threat", and only the threat objects are output. The detected OOIs may then be displayed on a display device (e.g., LCD, LED or CRT display system) at operation 404.

The methodology 300, and particularly the operations 304 and 310, use machine learning to facilitate image segmentation by decluttering the LMs associated with the various MOIs. The decluttered LMs, referred to as neighborhood maps (NMs), are merged into a single disambiguated material map (MM), which is a map of MOI IDs that is less ambiguous as to object material composition and easy to segment. This methodology forms an important portion of an ATR which may be thought of as an "adaptive ATR" system (or "AATR"). By "adaptive ATR", it is meant that the methodology 300 has the ability to quickly adapt (with re-training) as the MOIs change. The transformation from the CT image of a bag to a set of LMs (one per MOI) is described in greater detail in Section 2 below. Section 3 then describes how machine learning may be used to declutter those LMs and to merge the resulting NMs into a single material map that is easy to segment. Section 4 describes how segments are extracted from this material map. Some features used to classify each segment as "of interest" vs. "not of interest" are also described.

With further reference to FIGS. 6, 7a and 7b, the methodology 304 uses a bank of trained voxel neighborhood classifiers. For each MOI $M_k$ (k=1 ... K), there is one such binary classifier. The role of the classifier for MOI $M_k$ is to declutter the LM for that MOI by classifying each voxel neighborhood in that LM as relevant or irrelevant to OOIs for MOI $M_k$. The classifier relies on the expanded spatial context of a voxel neighborhood to improve performance beyond what is possible with likelihood-based methods that are informed by the spatial context of a single voxel. An assumption made here is that weak voxel neighborhood classifiers will be sufficient for our needs. To test this assumption, training was carried out on weak binary decision tree classifiers (one per MOI) on a small set of engineered features for voxel neighborhoods. Three mechanisms work collaboratively to improve the effectiveness of these weak classifiers: 1) each classifier is applied to the CT image after it has been transformed into a likelihood map in which far fewer voxels are emphasized; 2) multiple classifiers are used, and each is trained on LMs for a different MOI with possibly different neighborhood sizes; and 3) each classifier is applied to every possible voxel neighborhood (a dense ensemble of voxels).

The first two of these three mechanisms allow the use of one weak classifier per MOI rather than one strong classifier for all MOIs. Convolutional neural networks (CNNs) trained using deep learning are a natural choice for strong voxel neighborhood classifiers. However, even with GPUs, CNNs can be computationally expensive to evaluate on the neighborhood of every voxel. To reduce computational complexity, one might instead apply a fully convolutional neural network (a la U-Net) to adjacent non-overlapping voxel neighborhoods. Such CNNs produce output arrays that are the size of a voxel neighborhood. Because CNNs are spatially hierarchical, it is well understood that they perform well when the context of the image to be classified is large. For example, since CNNs can be trained to recognize families of shapes in large images, they are useful for detecting prohibited items such as guns and knives in x-ray CT images of baggage. However, because the spatial context of a voxel neighborhood is far more limited, it is reasonable to hypothesize that a weak classifier will be sufficient and appropriate for most needs.

The third of our mechanisms produces a consensus classification result by applying one weak binary decision tree classifier to an ensemble of spatially overlapping voxel neighborhoods. This is the opposite of what ensemble classifiers do. In particular, a random forest is a strong classifier that would seek consensus by applying an ensemble of weak binary decision tree classifiers to each voxel neighborhood. The advantage of weak binary decision trees for voxel neighborhood classification is that they are far cheaper to evaluate.

These three mechanisms thus allow for entertaining the possibility of applying weak classifiers to dense ensembles of voxel neighborhoods. Section 5 provides examples which support the validity of our hypothesis that weak voxel neighborhood classifiers are sufficient and appropriate for our needs.

2. Likelihood Maps

For an x-ray CT image with voxels $v(\underline{x})$ at location $\underline{x}=(x,y,z)$ (i.e., column x and row y in slice z), the value $\underline{v}$ is a scalar for single-energy systems and a 2×1 vector for dual-energy systems. In the single-energy case, $\underline{v}$ is typically a linear attenuation coefficient (LAC) $\mu$ for a single energy. In the dual-energy case, $\underline{v}$ may represent a pair of LACs $(\mu_L, \mu_H)$ at low and high energies, a pair of system independent rho Z (SIRZ) coefficients $(\rho_e, Z_e)$ representing effective electron density and atomic number [8-11], a pair of synthesized monochromatic basis (SMB) coefficients $(\mu'_L, \mu'_H)$, etc. In the dual-energy cases, the $\mu_H$, $\mu'_H$ and $\rho_e$ channels tend to be less noisy than the $\mu_L$, $\mu'_L$ and $Z_e$ channels.

One may have access to CT images with companion ground truth data that identifies the CT image voxels associated with specific objects of interest (OOIs). Each OOI contains a particular MOI $M_k$, k=1 ... K. For each MOI $M_k$, a likelihood function can be approximated as a sample probability density function (PDF) derived from CT image voxels associated with that MOI. Note that the domain of $p(\underline{v}|M_k)$ lies in the space of the voxel modality (e.g., in SIRZ, SMB or LAC space). If no ground truth is available, one could approximate $p(\underline{v}|M_k)$ by fitting a curve or surface over an appropriate interval (for single-energy images) or region (for two-channel images) within that space.

For a CT image voxel $\underline{v}$, the joint likelihood for MOI $M_k$ is $p(\underline{v}|M_k)$ and the marginal likelihood for channel b (b=0 or 1) is $p_b(v|M_k)$, where v is the scalar value of the voxel in channel b. The likelihood map (LM) for MOI $M_k$ is $p_{clean}(v(\underline{x})|M_k) = p_b(v(\underline{x})|M_k)$, where channel b is the less noisy channel. The normalized LMs $$\hat{p}_{clean}(v(\underline{x})|M_k) \triangleq p_{clean}(V(\underline{x})|M_k) / \max_v p_{clean}(v|M_k) \quad (1a)$$

$$k = 1 \ldots k$$

contain voxels that vary from zero to one. For k=0 (the non-MOI or background case), $$\hat{p}_{clean}(v(\underline{x})|M_0) = \begin{cases} 1 & \max_{k=1 \ldots K} \hat{p}_{clean}(v(\underline{x})|M_k) = 0 \\ 0 & \text{otherwise} \end{cases} \quad (1b)$$

Figure 8:
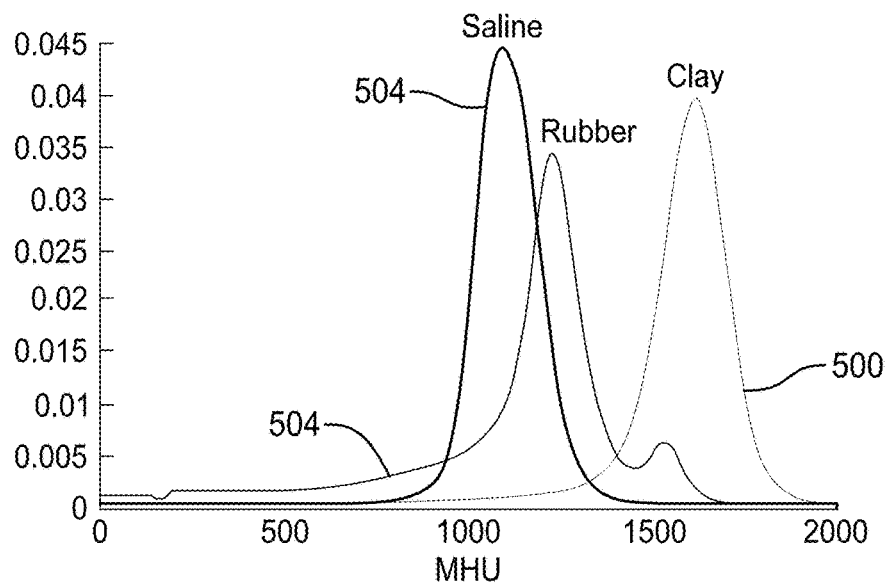
FIG. 8 shows graphs of likelihood functions for clay, rubber and saline derived from a training set of 30 bags.

For the experiments carried out using the methodology 300, the MOIs were limited to clay, rubber and saline (i.e., the OOIs contained only those materials). However, the MOIs could have been defined for explosives, precursors of explosives, drugs or other contraband, in which case, the OOIs would have been threats composed of those materials. In the case where the "MOI" is air surrounded by more dense material, the OOIs could be voids or cracks in imaged components. However, in this case, there would be only one MOI (air). A set of 188 x-ray CT images of plastic bins supplied by the ALERT Center of Excellence was used. The images were single-energy (single-channel) and their voxel values were in modified Hounsfield units (MHU). A ground truth map was supplied with each CT image. The set of 188 images was divided into a training set of 30 images and a non-overlapping test set of 158 images. FIG. 8 shows curves 500, 502 and 504 representing sample probability density functions (PDFs) for clay 500, saline 502 and rubber 504. These PDFs were estimated from voxels in the 30 training images and the companion ground truth files (i.e., ground truth maps). Clay is the densest of these materials, and the PDF curve 504 is most broad for rubber.

Figure 9:
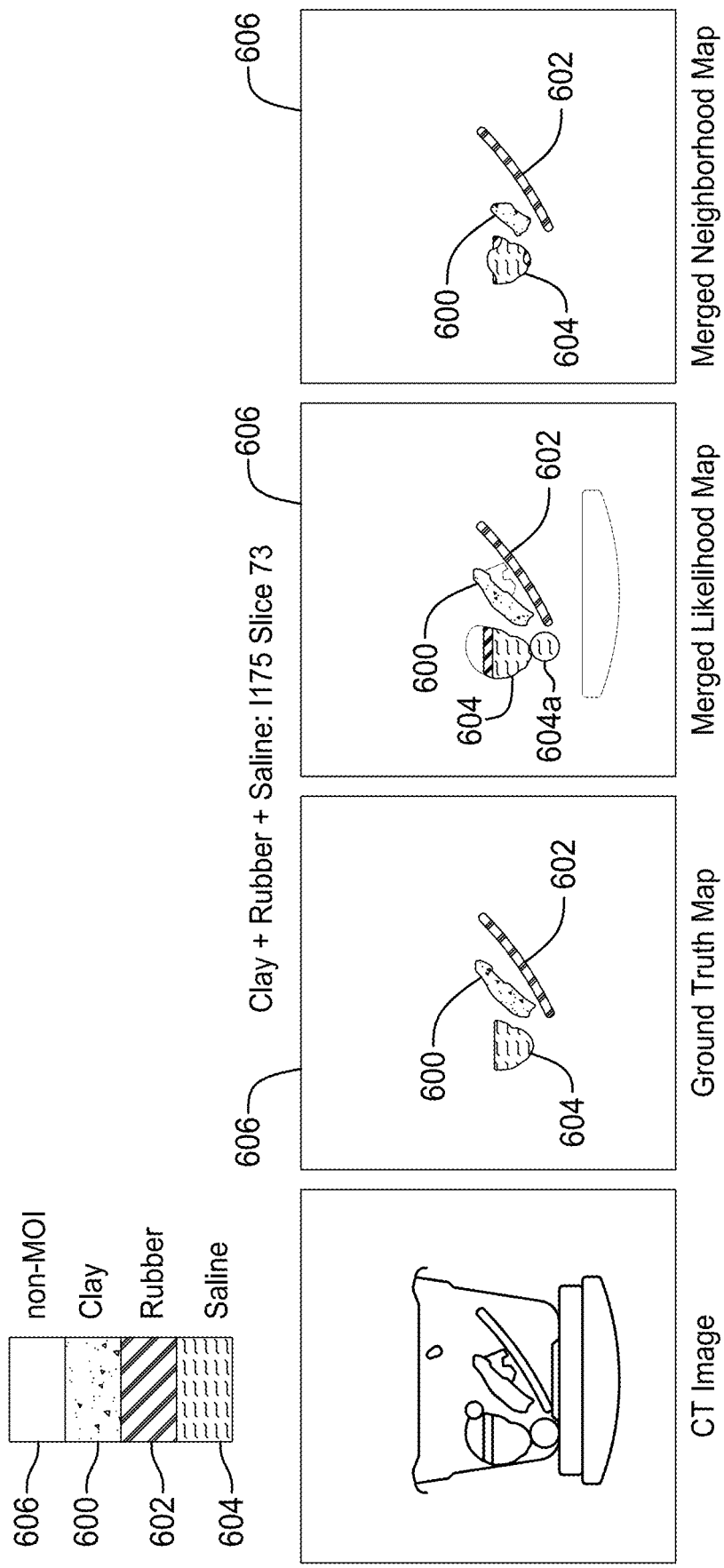
FIGS. 9a-9d show a CT image slice with its ground truth, and examples of likelihood and neighborhood maps merged across all MOIs.

FIGS. 9a shows one slice of a CT image which contains clay, rubber and saline. FIG. 9b shows the corresponding ground truth for the image in FIG. 9a. FIG. 9c illustrates one slice of a merged likelihood map (LM) and FIG. 9d illustrates a merged neighborhood map. The merged LM of FIG. 9c is a maximum likelihood (ML) material map (map of MOI IDs). It is formed by merging LMs for the three MOIs (with clay 600 in blue, rubber 602 in red, saline 604 in green and non-MOI 606 in black). The voxels in the ML material map are based on maximum likelihood estimates of material composition for individual voxels:

$$MM_{ML}(\underline{x}) = \begin{cases} \arg\max_{k=1 \ldots K} p_{clean}(v(\underline{x})|M_k) & \max_{k=1 \ldots K} p_{clean}(v(\underline{x})|M_k) > 0 \\ 0 & \text{otherwise} \end{cases} \quad (2)$$

Only a fraction of the nonzero CT image voxels are emphasized (highlighted) in the merged LM of FIG. 9c. However, the merged LM of FIG. 9c contains numerous clutter (non-ground truth) voxels. It also contains a round green object 604a that is missing from the ground truth. The solid color aggregations in the merged LM of FIG. 9c are contaminated with voxels of other colors, suggesting ambiguity as to voxel material composition.

3. Neighborhood Maps

As noted above, the methodology 304 in one implementation uses machine learning to declutter the LMs and facilitate image segmentation, and will now be described in greater detail. A decluttered LM is referred to as a neighborhood map (NM), and is obtained by applying a trained binary decision tree classifier to every voxel neighborhood in the LM. There is one classifier for each MOI, and each classifier is trained separately. The neighborhood maps for the various MOIs are merged into a single disambiguated material map (MM) that is easy to segment. The ATR results are obtained by segmenting this material map (as in Section 4 below).

3.1 Voxel Neighborhood Features

Each voxel neighborhood in a likelihood map is classified based on its vector of engineered features. Engineered features are needed because the classifiers are binary decision trees, as opposed to CNNs. The engineered features have been crafted to capture different aspects (characteristics) of LM voxel neighborhood content. Also, since all of the proposed engineered features are computable as moving averages, the cost of extracting voxel neighborhood features is invariant to neighborhood size (i.e., it is the same for both small and large neighborhoods). This is important because for some OOIs, the appropriate neighborhood sizes could be large.

For a sequence $s_k$ in 1D, moving averages within an interval of prescribed extent are computed by forming an accumulator array $a_k$: $a_0=s_0$ and $a_k=a_{k-1}+s_k$ for k>0. The moving average within the interval of extent $\Delta$ beginning on sample k in the 1D sequence can be computed as $\bar{s}_k=(a_k-a_{k-\Delta})/\Delta$ in two operations, independent of $\Delta$. For images in 3D, moving averages can be computed within rectangular volumes by generating accumulator arrays in each of three orthogonal directions and applying moving average calculations in 1D three times.

Figure 10:
FIG. 10 is a description table with definitions of various terms used to describe features of the present disclosure.

One example of a collection of engineered voxel neighborhood features is summarized in table 700 of FIG. 10. The engineered voxel neighborhood features all vary from zero to one and are computable as moving averages (means) within voxel neighborhoods. The likelihood feature captures the strength of the nonzero voxels in a neighborhood as the mean of nonzero likelihoods. The "MOI fraction" feature captures the concentration of material within a neighborhood as the number of nonzero likelihood voxels divided by the number of neighborhood voxels. The centrality feature captures the degree to which material within a neighborhood is centered on that neighborhood rather than being off to one side. It depends on the neighborhood centroid which is based on the mean within a voxel neighborhood of x, y or z times the LM voxel value. The surface area feature captures the amount of surface area of contact between material and non-material as the mean within voxel neighborhoods of a bit map of edge voxels.

3.2 Bank of Binary Decision Tree Classifiers on Voxel Neighborhoods

The LM for each MOI $M_k$ is transformed into a field (3D array) of feature vectors $\underline{f}(\underline{x}|M_k)$ (the feature vector for the neighborhood of the voxel at location $\underline{x}$ in the LM for MOI $M_k$). For a given MOI, the training objective is to produce a binary classification tree ("BCT", hereinafter simply "BCT"), or any other suitable classifier, that, when applied to the field of feature vectors, generates an output that resembles the ground truth map as much as possible. The BCT selects the relevant engineered features from among all engineered features (as opposed to a CNN training algorithm which attempts to learn the relevant voxel neighborhood features).

For each MOI, the BCT learns the best voxel neighborhood halfwidth and associated feature thresholds using an "embedded" training algorithm. For a given neighborhood halfwidth, the optimal BCT feature thresholds are learned using the usual well-known greedy algorithm. The training is embedded in the sense that this greedy algorithm is applied within a loop over all candidate neighborhood halfwidths. Only isotropic neighborhoods are considered (i.e., neighborhood width is the same in all three dimensions). Such neighborhoods reduce training time and otherwise make sense because the orientations of the OOIs are unknown a priori.

For each MOI and for a given candidate voxel neighborhood halfwidth, a table of labeled feature vectors is generated. Since our classifiers are binary, there are only two labels ("+" and "−"). However, there is one binary classifier for each MOI. A feature vector is labeled as "+" if the voxel at the center of the neighborhood has a nonzero LM value and it is labeled as an OOI voxel in the ground truth. A feature vector is labeled as "−" if the voxel at the center of the neighborhood has a nonzero LM value and it is not labeled as an OOI voxel in the ground truth. This set of feature vectors is split using the usual well-known greedy algorithm. For each feature, this algorithm finds the threshold that minimizes the number of classification errors on the input set. The feature that leads to the lowest error probability is used. This process is repeated on the resulting subsets of feature vectors until convergence has been achieved. In lieu of using a validation set, over-training can be suppressed by limiting the number of times a feature can be split, by allowing a split to occur only if the error probability decreases by at least a certain amount, and by establishing a lower bound on tree leaf size (the number of feature vectors from the labeled training set that are attached to a leaf). For this study, a limit was imposed of no more than two splits per feature, the error probability had to decrease by more than 5% on each split, and a leaf could contain no fewer than 10 feature vectors.

FIGS. 11a1-11a3, 11b1-11b3 and 11c1-11c3 shows binary classification tree training results on labeled voxel neighborhoods from a 30-image training set. FIGS. 11a1-11a3 are training results on labeled voxel neighborhoods from clay LMs, FIGS. 11b1-11b3 are the training results from rubber LMs, and FIGS. 11c1-11c3 are the training results from saline LMs. FIGS. 11a1, 11b1 and 11c1 are for error probability ($P_E$), FIGS. 11a2, 11b2 and 11c2 are for detection probability ($P_D$), and FIGS. 11a3, 11b3 and 11c3 are false alarm probability ($P_{FA}$), respectively. Each bar chart has 16 bars, for candidate voxel neighborhood halfwidths of 0 (the single voxel case) and 1-15. These voxel neighborhoods are nearly isotropic because the voxels are all approximately 1 mm×1 mm×1 mm in size.

For each MOI, a balanced labeled training set of feature vectors was constructed from ~1000 positive and ~1000 negative neighborhoods sampled across 30 training images. Thus, when the voxel neighborhoods contain only one voxel, ($P_E$, $P_D$, $P_{FA}$)=(0.5, 1.0, 1.0) by construction. In this case, voxels are classified in the LM as "+" if their likelihood values are >0 and as "−" otherwise. Since all LM voxels in the training set have values>0, half of them are classified incorrectly, all positive training set voxels are classified correctly, and all negative training set voxels are classified incorrectly. As the voxel neighborhoods grow, the optimal $P_E$, $P_D$ and $P_{FA}$ values vary.

For each MOI, the optimal neighborhood halfwidth is chosen as the smallest halfwidth for which the next larger halfwidth has a larger error probability. Beyond this halfwidth, the error probability did not consistently improve. These halfwidths are 5 for clay, 4 for rubber and 4 for saline. FIGS. 12a-12c show the trained BCTs for the various MOIs based on these halfwidths. The leaves are labeled with posterior probability estimates $P(M_k|\underline{f}(\underline{x}|M_k))=P(M_k|\underline{f}(\underline{x}))$. The feature vector $\underline{f}(\underline{x}|M_k)$ is classified as MOI $M_k$ if and only if $P(M_k|\underline{f}(\underline{x}|M_k))>0$. Each internal node 800 is labeled with a specific voxel neighborhood feature and a learned feature threshold (that is, each internal node shown in FIG. 12 has a feature name and an associated feature threshold value). A feature vector propagates to the left at an internal node 800 if, and only if, the value of the feature that the internal node is labeled with is less than the feature threshold. For clay and saline, BCT training selected only the likelihood and MOI fraction features as relevant. For rubber, all four features were selected as relevant (i.e., in FIG. 12b, each of the four voxel neighborhood features is assigned to at least one internal node).

As for Table 900 of FIG. 13, the optimal neighborhood halfwidth for rubber is smaller possibly because most of the rubber OOIs are thin objects, whereas most of the clay and saline OOIs are thicker bulk objects. $P_D$ is greatest for clay possibly because the clay PDF is the most narrow. $P_D$ is least for rubber possibly because the rubber PDF is the widest. $P_{FA}$ is greatest for saline possibly because it is easily confused with water.

3.3 Merging Neighborhood Maps into Disambiguated Material Maps (MMs)

Perhaps the simplest way to define the neighborhood map $NM(\underline{x}|M_k)$ for MOI $M_k$ at location $\underline{x}$ would be to set $NM(\underline{x}|M_k)=P(M_k|f(\underline{x}))$. This method leads to a map of posteriors in which objects appear dilated (bloated) by an amount that increases with neighborhood size. To prevent object dilation, one can set $NM(\underline{x}|M_k)=0$ whenever $p_{clean}(v(\underline{x})|M_k)=$(in which case, the classifier for MOI $M_k$ only needs to be applied to voxels for which $p_{clean}(v(\underline{x})|M_k)>0$). Also, it is clear from FIG. 12a-12c that posterior maps produced by evaluating our trained classifiers on voxel neighborhoods in likelihood maps can return only a small number of possible values. To increase the number of possible voxel values in a neighborhood map, one option would be to treat the binary classification tree as a density tree that returns likelihoods (as opposed to posteriors). Another option is to assign the value of the likelihood feature of the voxel neighborhood centered on location $\underline{x}$ (first row in Table 700 of FIG. 10) to the neighborhood map at $\underline{x}$ when the posterior at $\underline{x}$ is nonzero:

$$NM(\underline{x}|M_k) = \begin{cases} f_{likelihood}(\underline{x}|M_k) & P(M_k|\underline{f}(\underline{x})) > 0 \text{ and } p_{clean}(v(\underline{x})|M_k) > 0 \\ 0 & \text{otherwise} \end{cases} \quad (3)$$

The neighborhood map in (3) above contains likelihoods (as opposed to posteriors), and maps to the "generate neighborhood map box 304d in FIG. 7a.

By merging neighborhood maps across all MOIs, one can create a disambiguated material map $MM(\underline{x})$ (or threat category image) that is easy to segment. For each voxel location, the simplest merging method computes $MM(\underline{x})$ as the ID of the MOI for which the neighborhood map is largest. However, the neighborhood map in (3) contains normalized likelihood values. A maximum likelihood estimate of object material composition can be reflected in the disambiguated material map by instead choosing the ID of the MOI for which the likelihood is largest:

$$\begin{cases} \arg\max_{k=1\ldots K}[p_{max}(v|M_K) \cdot NM(\underline{x}|M_K)] & MM(x) = \max_{k=1\ldots K} NM(\underline{x}|M_k) > 0 \\ 0 & \text{otherwise} \end{cases} \quad (4a)$$

$$p_{max}(v|M_k) = \max_v p_{clean}(v|M_k) \quad (4b)$$

which maps to the "merge" sub-operation 304e in FIG. 7a.

The image slice shown in FIG. 9c is the merged LM formed by merging the LMs for clay, rubber and saline (this is the maximum likelihood material map $MM_{ML}(\underline{x})$ in (2)). The image slice shown in FIG. 9d is the merged NM formed by merging the NMs for clay, rubber and saline (this is the disambiguated material map $MM(\underline{x})$ (4)). The clutter and extra object present in the image slice of FIG. 9c are absent from the last image slice of FIG. 9d. $MM(\underline{x})$ is far less cluttered and ambiguous than $MM_{ML}(\underline{x})$. While $MM(\underline{x})$ more closely resembles the ground truth map, the clay object 600 (in blue) was somewhat truncated.

4. Classifying Segments As ATR Objects

FIG. 7b discussed above shows how the candidate segments are classified as "of interest" vs. "not of interest" (or "threat" vs. "non-threat") based on their features. These features are engineered to be discriminatory without being shape specific (because explosive threats, contraband, cracks and voids, etc. can occur in many shapes and sizes). Examples of such features include mass or volume, thickness, various measures of texture, various measures of flatness, various measures of elongation, various measures of roundness, etc. For each MOI, a binary density tree classifier (or possibly some other type of simple classifier) is trained on vectors of such features, the vectors being labeled as corresponding to a positive or negative exemplar object for that MOI type (based on ground truth). For each candidate segment, its MOI type in the material map that it came from is determined. The features of that candidate segment are then supplied to the segment classifier associated with that MOI type to produce a classification result of "of interest" vs. "not of interest".

5. Examples

FIGS. 15-22 show examples of merged NMs and ATR results for test images that contain objects with various combinations of MOIs. Each figure contains five pictures of some CT test image slice. The first row of each Figure includes images which show the CT image slice itself and its corresponding ground truth (e.g., FIGS. 15a and 15b, respectively; FIGS. 16a and 16b respectively, and so forth). The ground truth is color coded 1000 (blue) for clay; 1002 (red) for rubber; 1004 (green) for saline; and 1006 (black) for non-MOI. The second row of images shows the merged LM (this is the maximum likelihood material map $MM_{ML}(\underline{x})$ in (2)), the merged NM (this is the disambiguated material map $MM(\underline{x})$ in (4)), and the ATR object map (this is the final ATR output obtained by classifying the segments extracted from the merged NM).

One can see that the merged NMs generally contain less clutter and have less MOI ambiguity than the merged LMs. They also more closely resemble ground truth. The ATR object maps tend to further declutter the merged NMs. It should be noted that when objects of the same color appear broken in an ATR object map (as in FIG. 19d, for example), they are typically connected across image slices and are part of the same object. These examples collectively provide compelling evidence to suggest that by applying weak classifiers to a small number of engineered features computed on dense ensembles of voxel neighborhoods (such as the likelihood and MOI fraction features listed in Table 700 of FIG. 10), one can consistently produce ATR objects that closely resemble ground truth. Moreover, as illustrated in FIG. 22, the ATR does not alarm indiscriminately. Image slices that contain no OOIs are typically all black (reference number 1006) in the ATR object map.

The "rubber only" case in FIGS. 16a-16e provides a good example of material disambiguation. The rubber sheet is multi-colored in the merged LM, but all red (number 1002) in the merged NM. The "clay-saline" case in FIGS. 18a-18e provides a good example of the power that weak voxel neighborhood classifiers have in reducing clutter. It also illustrates that when segment supervoxels are used to re-assess object material composition (as in FIG. 12b), errors can be made. For the red object in the ATR object map of FIGS. 18d and 18e, the clay (blue, indicated by number 1000) and saline (green, indicated by number 1004) voxels in the merged LM of FIG. 18c combined to produce a supervoxel that is more consistent with rubber (red, indicated by number 1002) than with either clay (blue, indicated by number 1000) or saline (green, indicated by number 1004) in the ATR object map of FIG. 18c.

6. High Level Summary

The various embodiments and methodologies of the present disclosure present an ATR system that uses machine learning at the voxel neighborhood level to facilitate image segmentation and thus improve detection performance. Performance is further improved by significantly reducing the false alarm probability on potential threats (such as explosives and precursors of explosives, contraband, voids/cracks, etc.) in x-ray computed tomography (CT) images by applying machine learning at the object level to classify candidate segments as "object of interest" vs. "not object of interest". The CT image is first transformed into a set of likelihood maps, one for the material of interest (MOI) associated with each type of threat. This stochastic transformation emphasizes voxels that are consistent with the various MOIs and de-emphasizes the rest. A novel segmentation and decluttering methodology uses machine learning to facilitate image segmentation by decluttering the likelihood maps associated with the various MOIs. A bank of weak binary classification trees or BCTs (one per MOI) is trained on a few diverse engineered features of voxel neighborhoods within the likelihood maps for the various MOIs. The training objective is to produce a bank of BCTs that generates outputs resembling the ground truth maps as much as possible when applied to dense ensembles of voxel neighborhoods within the training bags. It was shown that the neighborhood map produced by applying the BCT for a given MOI to the likelihood map for that MOI tends to be far less cluttered. A novel method for merging the neighborhood maps of each MOI into a single material map (map of MOI IDs) is disclosed, which is easy to segment and far less ambiguous as to object material composition. The resulting candidate segments have an associated MOI type in the material map from which they came, and their features are supplied as input to the trained object classifier for that MOI type (from a second bank of binary classification trees trained on object features) to produce a classification decision of "object of interest" vs. "not object of interest".

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An automatic contraband recognition system for scanning an article to identify an object of interest (OOI) contained within the article, wherein the OOI may be at least one of a threat item or a contraband item, and where the system makes use of a computed tomography (CT) scanner for scanning the article to obtain a CT image scan of the objects within the article, and wherein a reconstructed CT image scan is represented by a plurality of two dimensional (2D) image slices of the article and its contents, the system comprising:
   a computer which operates to obtain, from each said two dimensional (2D) image slice, information forming a plurality of voxels making up the image slice;
   the computer configured to receive the information and, for the voxels associated with the CT image, to use machine learning to:
      analyze the voxels to create a likelihood map representing likelihoods that select voxels making up the CT image are associated with two or more differing predetermined materials of interest (MOI);
      further analyzing the likelihood map to construct neighborhoods of voxels within the likelihood map having the same MOI, for each said differing predetermined MOI, and using evaluations of the neighborhoods of voxels to declutter the likelihood map, to connect voxels associated with the same MOI together to form segments, and to connect the segments together to help construct the OOI for visual identification;
   wherein the segments are represented by at least one feature including a MOI type (ID), representing an ID of material (from 1 to K) that best explains segment material composition;
   wherein the computer is configured to analyze the voxels in the likelihood map by using moving average algorithms, in three dimensions, and computing engineered voxel neighborhood features associated with a neighborhood of each one of the voxels in the likelihood map; and
   wherein the engineered voxel neighborhood features include at least one of:
      a likelihood feature representing a mean of non-zero likelihood values within a voxel neighborhood; and
      a MOI fraction feature representing a fraction of neighborhood voxels that have non-zero likelihoods.

2. The system of claim 1, wherein the analyzing of the neighborhoods of voxels includes training a binary classification tree (BCT) to learn a neighborhood size and feature thresholds that jointly minimize discrepancy between decluttered likelihood maps and a ground truth map for the MOI.

3. The system of claim 2, wherein the computer is further configured to declutter the likelihood map by evaluating the trained BCT on vectors of voxel neighborhood features of the likelihood map.

4. The system of claim 1, wherein the engineered voxel neighborhood features further include:
   surface area fraction feature representing a fraction of neighborhood voxels that are edge voxels; and
   a centrality feature representing a degree to which the voxel neighborhood is centered on voxels with nonzero likelihood.

5. The system of claim 1, wherein:
   the computer is configured to analyze an additional MOI, different from the MOI, and to create an additional neighborhood map therefrom; and
   wherein the computer is configured to merge the neighborhood map and the additional neighborhood map to generate a disambiguated material map.

6. The system of claim 5, wherein the computer is configured to extract the segments using connected component analysis.

7. An automatic threat recognition system for scanning an article to identify different objects of interest (OOI) contained within the article, wherein the system makes use of a computed tomography (CT) scanner for scanning the article to obtain a CT image scan of the objects within the article, a reconstructed CT image scan represented by a plurality of two dimensional (2D) image slices of the article and its contents, the system comprising:
   a computer which receives each said two dimensional (2D) image slice and obtains therefrom information forming a plurality of voxels representing each said image slice;
   the computer configured to use the voxels associated with each said CT image slice, in connection with a machine learning operation, to:
      analyze the voxels to create likelihood maps, one for each differing material of interest MOI, representing likelihoods that voxels making up the CT image are associated with each one of said differing materials of interest (MOI);
      for each said likelihood map, the computer is configured to:
         analyze the voxels in the likelihood map by using moving average algorithms, in three dimensions, and computing engineered voxel neighborhood features, independent of cost and neighborhood size, wherein the engineered voxel neighborhood features include a surface area fraction feature representing a fraction of neighborhood voxels that are edge voxels;
         train a binary classification tree (BCT) to learn the neighborhood size and feature thresholds that jointly minimize discrepancy between a decluttered likelihood map and a ground truth map for the MOI;
      declutter the likelihood maps by evaluating trained BCTs on vectors of likelihood map voxel neighborhood features;
   the computer further being configured to merge the decluttered likelihood maps for each of the MOIs into a single disambiguated material map, and to connect voxels associated with like ones of the MOIs together to form segments, and to connect segments together to construct candidate OOIs, each being made up of a common said MOI, to assist with rapid identification of the OOIs; and wherein the segments are represented by one or more features including an MOI type (ID), representing an ID of material (from 1 to K) that best explains segment material composition.

8. The system of claim 7, wherein the engineered voxel neighborhood features include:
a likelihood feature representing a mean of non-zero likelihood values within a voxel neighborhood;
an MOI fraction feature representing a fraction of neighborhood voxels that have non-zero likelihoods; and
a centrality feature representing a degree to which the voxel neighborhood is centered on voxels with nonzero likelihood.

9. The system of claim 7, wherein the moving averages are calculated by the computer by computing moving averages within rectangular volumes by generating accumulator arrays in each of three orthogonal directions and applying moving average calculations in one dimension three times.

10. The system of claim 7, wherein for each said MOI, the BCT operates to learn an optimal voxel neighborhood halfwidth and associated feature thresholds using an embedded training algorithm.

11. The system of claim 10, wherein for each said MOI, and for a given candidate voxel neighborhood halfwidth, a table of labeled feature vectors is generated for training a binary classifier by assigning a label of "+" or "−" to each feature vector for each said MOI, and
wherein a feature vector is labeled "+" if the voxel at a center of the neighborhood has a non-zero likelihood map value and it is labelled as an OOI in the ground truth; and
the feature vector is labeled as "−" if the voxel at the center of the neighborhood has a non-zero likelihood map value and it is not labelled as an OOI voxel in the ground truth.

12. The system of claim 7, wherein a disambiguated material map ("MM") is created by, for a location of each said voxel:
computing MM(x), where "x" is the location of the voxel, of the identification of the MOI for which the neighborhood map is largest; and
by setting MM(x) to zero when a value of voxel at x in the neighborhood map for every said MOI is equal to zero.

13. The system of claim 7, wherein the computer operates to connect the segments, classify the segments as "of interest" or "not of interest", and wherein segments "not of interest" are discarded.

14. The system of claim 13, wherein the segments are represented by one or more features, including:
an MOI score, representing a normalized likelihood from 0 to 1;
a location feature, representing a centroid in x, y and z coordinates;
an extent feature, representing a dimension in x, y, z overall;
mass;
thickness; and
texture, represented by standard deviation of least noisy channel values for ones of said CT image voxels in a given said segment.

15. The system of claim 14, wherein the location and extent features are utilized for object localization and performance characterization against the ground truth; and wherein the mass, the thickness and the texture are utilized for discrimination purposes to classify a specific one or more of the segments as being of interest or not of interest.

16. A method for identifying an object of interest (OOI) within an article, in an automated fashion, the method comprising:
using a computed tomography (CT) scanner to scan the article to obtain a CT image scan of the objects within the article, a reconstructed CT image scan represented by a plurality of two dimensional (2D) image slices of the article and its contents, wherein each said two dimensional (2D) image slice includes information forming a plurality of voxels;
using a computer configured to receive the information and, for the voxels associated with the CT image, to use machine learning to:
analyze the voxels to create a likelihood map representing likelihoods that voxels making up the CT image are associated with at least one material of interest (MOI);
analyzing the likelihood map to construct neighborhoods of voxels having the same MOI within the likelihood map, and using evaluations of the neighborhoods of voxels to declutter the likelihood map, to connect ones of the voxels of a like MOI together into segments, and to connect the segments of a like said MOI together to help construct candidate OOIs to help enable rapid identification of OOIs;
wherein the segments are represented by one or more features including a MOI type (ID), representing an ID of material (from 1 to K) that best explains segment material composition,
wherein the analysis of the voxels in the likelihood map by the computer further includes using moving average algorithms, in three dimensions, and computing engineered voxel neighborhood features associated with a neighborhood of each one of the voxels in the likelihood map; and
wherein the engineered voxel neighborhood features include at least one of:
a likelihood feature representing a mean of non-zero likelihood values within a voxel neighborhood; and
a MOI fraction feature representing a fraction of neighborhood voxels that have non-zero likelihoods.

17. The method of claim 16, further comprising displaying the OOI on a visual display system.

18. An automatic inspection system for scanning a workpiece article to identify a defect forming at least one of a void or crack in the workpiece, and where the system makes use of a computed tomography (CT) scanner for scanning the workpiece to produce a reconstructed CT image scan made up of a plurality of two dimensional (2D) image slices of the workpiece, the system comprising:
a computer which operates to obtain, from each said two dimensional (2D) image slice, information forming a plurality of voxels making up the image slice;
the computer configured to receive the information and, for the voxels associated with the CT image, to use machine learning to:
analyze the voxels to create a likelihood map representing likelihoods that voxels making up the CT image are associated with a common material of interest (MOI); and
further analyzing the likelihood map to construct neighborhoods of voxels having a common said MOI within the likelihood map, and using evaluations of the neighborhoods of voxels to declutter the likelihood map, to connect voxels associated with the defect together to form segments, wherein the segments indicate at least one of a void or a crack in the workpiece;
wherein the segments are represented by one or more features, including a MOI type (ID), representing an ID of material (from 1 to K) that best explains segment material composition;
wherein the computer is configured to analyze the voxels in the likelihood map by using moving average algorithms, in three dimensions, and computing engineered voxel neighborhood features associated with a neighborhood of each one of the voxels in the likelihood map; and
wherein the engineered voxel neighborhood features include at least:
  a likelihood feature representing a mean of non-zero likelihood values within a voxel neighborhood; and
  a MOI fraction feature representing a fraction of neighborhood voxels that have non-zero likelihoods.

* * * * *